United States Patent
Tal et al.

(10) Patent No.: US 12,156,091 B2
(45) Date of Patent: *Nov. 26, 2024

(54) SYSTEM AND METHOD FOR OPTIMIZING COLLECTION AND TRANSMISSION OF SURVEYING DATA ACROSS A ROAD NETWORK

(71) Applicant: Visual Defence Inc., Richmond Hill (CA)

(72) Inventors: Royi Tal, Richmond Hill (CA); Thomas Bakonyi, Richmond Hill (CA); Redenthor Ibana, Richmond Hill (CA)

(73) Assignee: Visual Defence Inc., Richmond Hill (CA)

( * ) Notice: Subject to any disclaimer, the term of this patent is extended or adjusted under 35 U.S.C. 154(b) by 482 days.

This patent is subject to a terminal disclaimer.

(21) Appl. No.: 17/559,315

(22) Filed: Dec. 22, 2021

(65) Prior Publication Data

US 2022/0116742 A1     Apr. 14, 2022

Related U.S. Application Data

(63) Continuation-in-part of application No. 16/930,070, filed on Jul. 15, 2020, now Pat. No. 11,481,991.

(51) Int. Cl.
| | |
|---|---|
| *H04W 4/02* | (2018.01) |
| *G06N 5/04* | (2023.01) |
| *G06T 7/70* | (2017.01) |
| *H04W 4/021* | (2018.01) |
| *H04W 4/44* | (2018.01) |

(52) U.S. Cl.
CPC ............. *H04W 4/023* (2013.01); *G06N 5/04* (2013.01); *G06T 7/70* (2017.01); *H04W 4/021* (2013.01); *H04W 4/44* (2018.02); *G06T 2207/30252* (2013.01)

(58) Field of Classification Search
CPC .......... H04W 4/023; H04W 4/44; G06T 7/70; G06T 2207/30252
See application file for complete search history.

(56) References Cited

U.S. PATENT DOCUMENTS

| | | | |
|---|---|---|---|
| 11,481,991 B2 * | 10/2022 | Tal | G06V 20/58 |
| 2017/0200061 A1 | 7/2017 | Julian et al. | |
| 2018/0330526 A1 | 11/2018 | Corcoran | |

(Continued)

FOREIGN PATENT DOCUMENTS

EP          3618012 A1    3/2020

OTHER PUBLICATIONS

European Search Report for related EP Application No. 21185548.1 dated Nov. 12, 2021, 11 pages.

(Continued)

*Primary Examiner* — Myron Wyche

(74) *Attorney, Agent, or Firm* — Procopio, Cory, Hargreaves & Savitch LLP

(57) ABSTRACT

System and methods for automated data collection and reporting while operating a vehicle on the road using a device. The device automatically determines when to collect, store, process and transmit data. Additionally, a system and method for further storing, transmitting, processing, organizing and accessing the information with respect to the collected data.

20 Claims, 12 Drawing Sheets

(56) References Cited

U.S. PATENT DOCUMENTS

2019/0034735 A1    1/2019    Cuban

OTHER PUBLICATIONS

Subhasis Das et al., "Traffic Sign Detection Mobile App CS 231M-Project", Jun. 30, 2014, pp. 1-2.
Tung Yu-Chih et al., "Use of Phone Sensors to Enhance Distracted Pedestrians' Safety", IEEE Transactions on Mobile Computing., vol. 17, No. 6, Jun. 1, 2018, pp. 1469-1482.

* cited by examiner

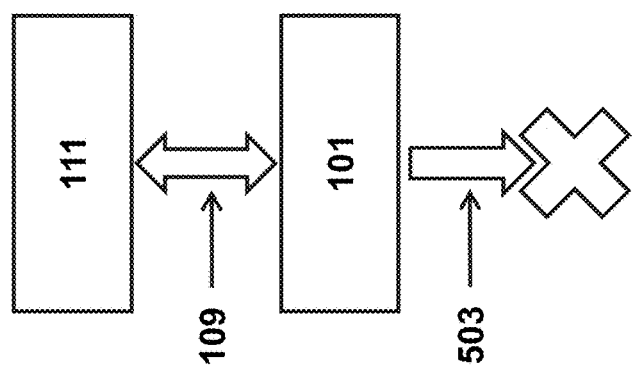
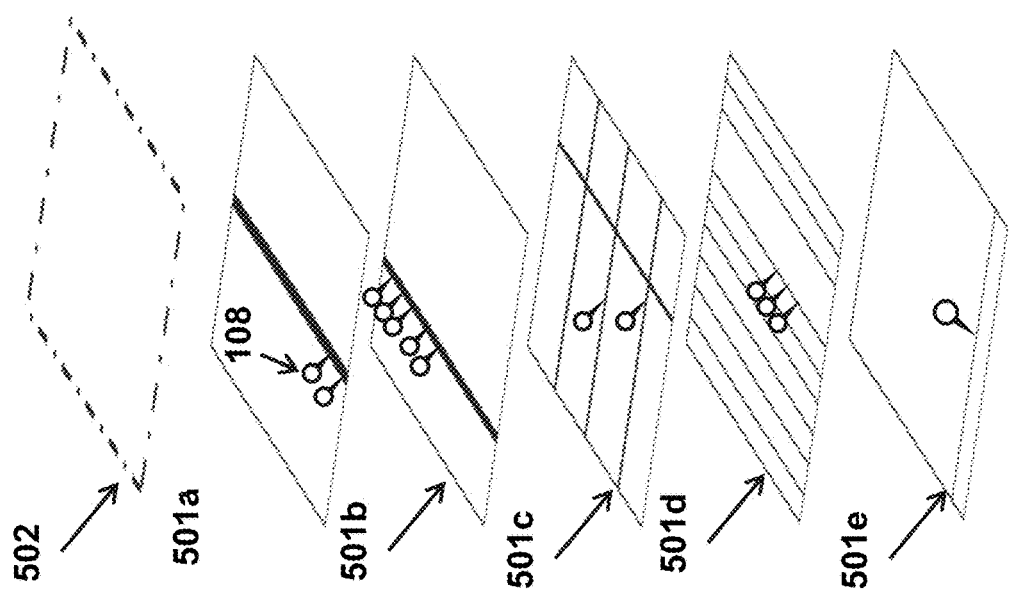
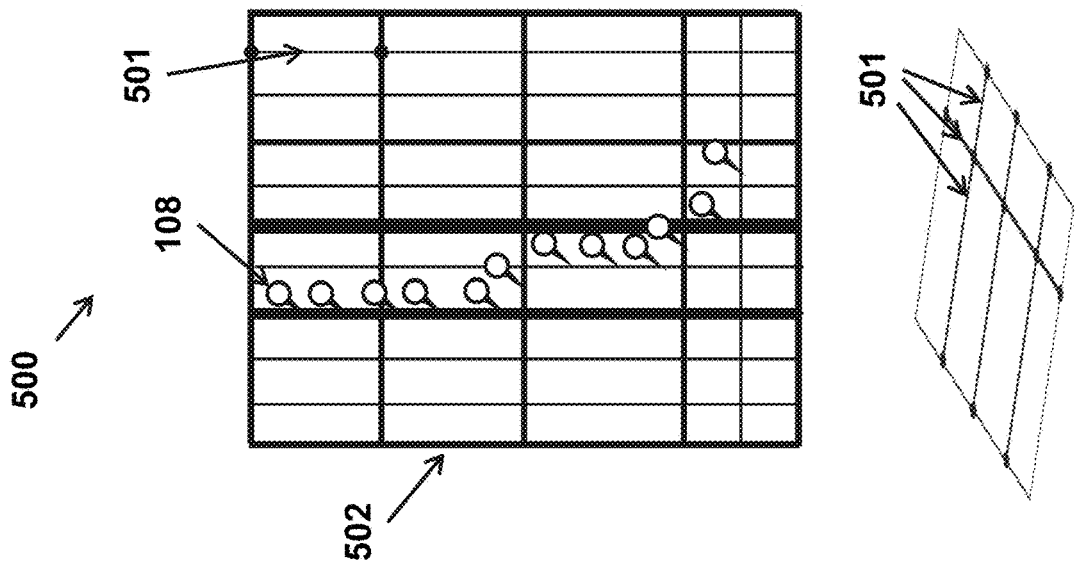
Figure 5

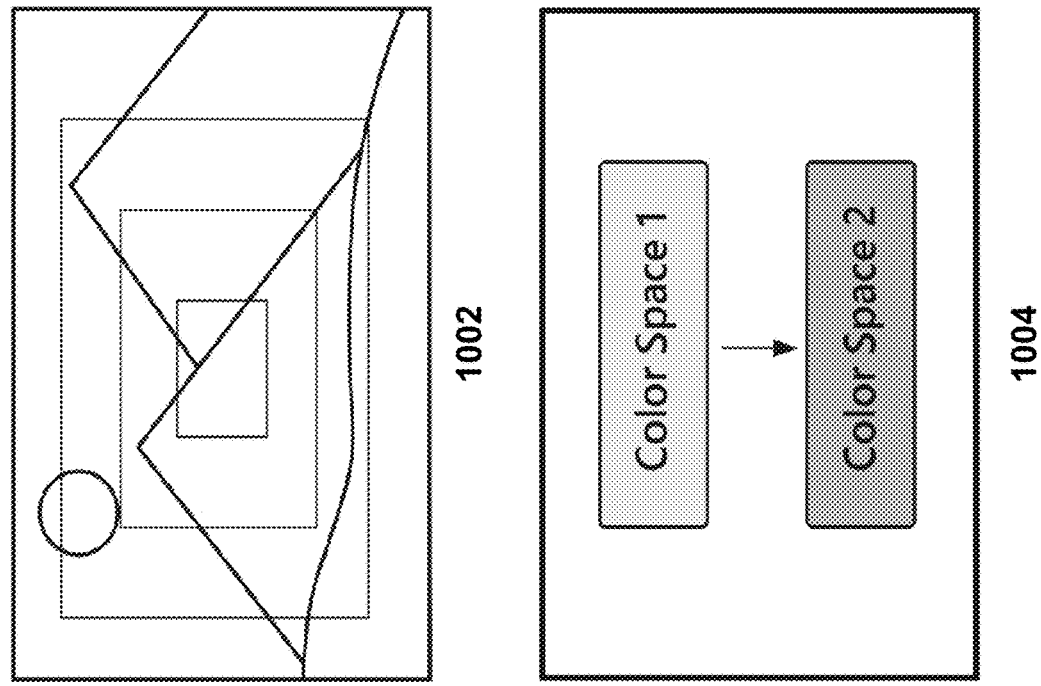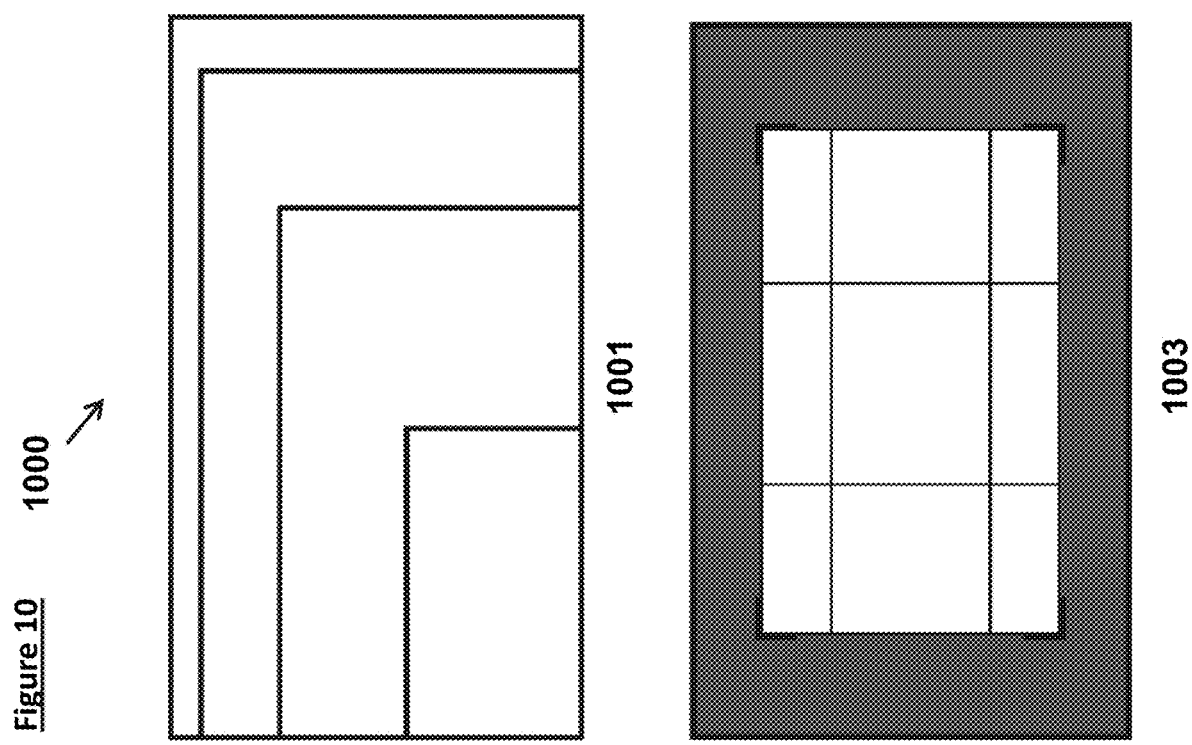
Figure 10

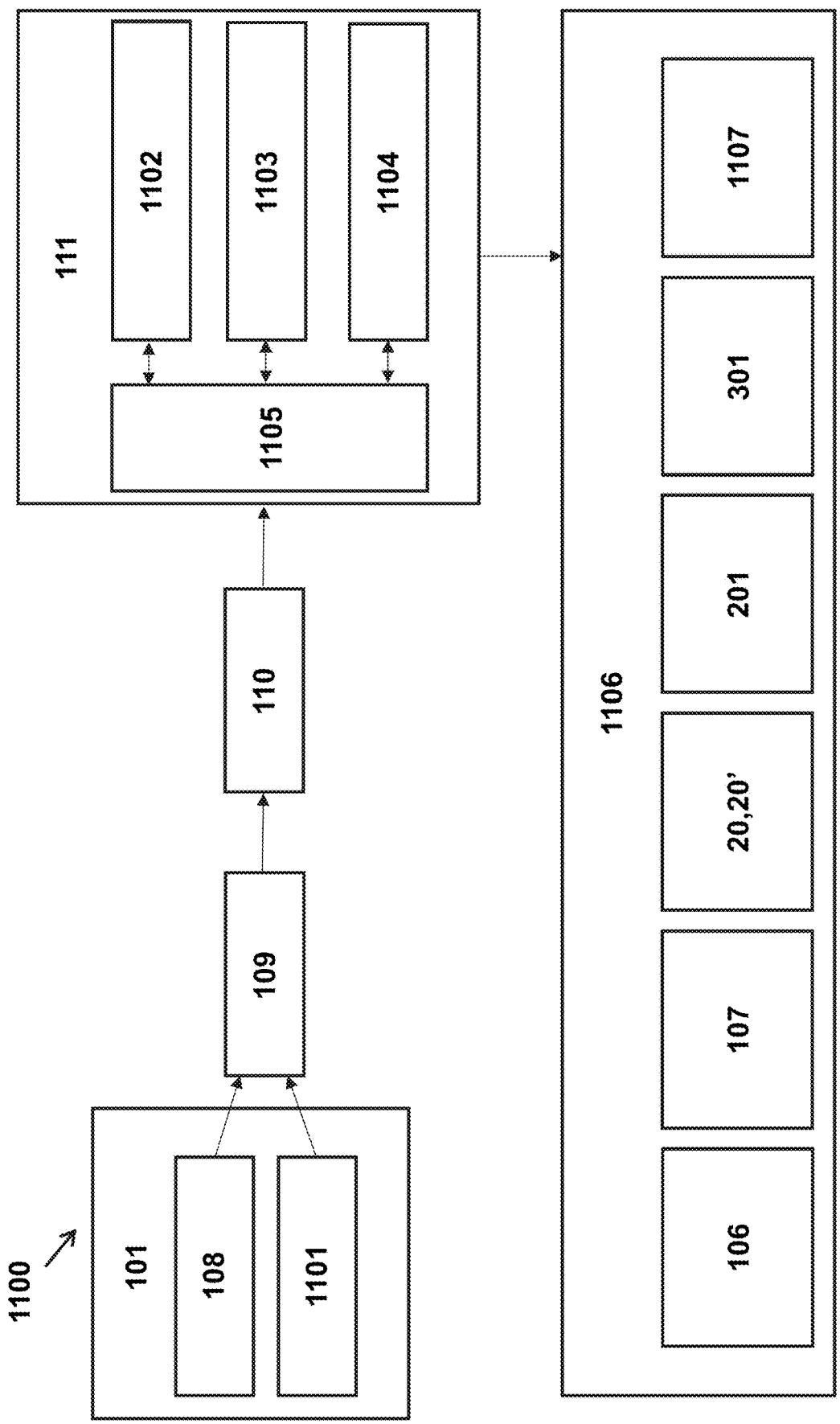

SYSTEM AND METHOD FOR OPTIMIZING COLLECTION AND TRANSMISSION OF SURVEYING DATA ACROSS A ROAD NETWORK

CROSS-REFERENCE TO RELATED APPLICATION

This application is a continuation-in-part application of U.S. patent application Ser. No. 16/930,070 filed on Jul. 15, 2020 entitled "SYSTEM AND METHOD FOR DETECTING AND TRANSMITTING INCIDENTS OF INTEREST OF A ROADWAY TO A REMOTE SERVER"; the contents of which are hereby incorporated by reference.

FIELD

The present invention is related to the surveying field, including image and data acquisition.

BACKGROUND

Roads are the arteries through which the economy pulses. The flow of goods and people facilitates commerce, jobs and the social benefits which they derive. As such, governmental and private road operators undertake extensive work to maintain road assets and associated infrastructure.

As part of the asset management life-cycle of a roadway, surveying activities are typically outsourced to third party companies (although they are sometimes done in house as well). Surveying is a broad term that represents different levels of data collection and data analysis. The surveying contractor can collect different types of data using different types of sensors. Examples of sensors used in surveying activities include monocular cameras, stereoscopic cameras, thermal cameras, panoramic cameras, laser sensors, acoustic sensors, level/orientation sensors, vibration/roughness/bumpiness sensors, accelerometer sensors, IMU Sensors, LIDAR sensors, and other types of surveying tools and sensors. The data is also typically collected in conjunction with location position sensor data, such as GPS or GNSS coordinates. The different sensors collect different data that can be analyzed for different purposes. For example, in relation to a roadway, some data can be used to identify defects on the road; some data can be used to assign a severity or priority to the defects on the road; some data can be used to identify issues underneath the road; some data can be used to quantify the roughness of the road.

Surveying has been historically (and still is), a service based activity. The asset owners use in-house or external specialists to render this activity as a service, whereas a surveyor drives around in a vehicle equipped with a sensor-set to collect data for analysis. The activity typically covers part or all of the road network, and the surveyor traverses the required areas, collects data and afterwards produces a report once the survey activity has been completed and the surveyor has returned from their travels. Road network is a common name which can be used to refer to all roads within a certain geography or ownership. Digitally, a road network can be a repository/dataset/asset list of roads and their associated fields.

The data collected can then be further processed to provide reports about the condition of the assets and road network. Either the surveyor or other parties can do the analysis and reporting. These reports can include calculated metrics such as: pavement condition index, road condition index, international roughness index, condition ratings, or other metrics. The metrics are typically calculated on points or sections of the roadway and then aggregated on a road segment basis, where each segment has ratings. A road segment can be defined as a section of the road that is identified uniquely in an asset registry (or list, or database, or repository). Importantly, the survey report can then be used to plan different types of preventative and corrective road maintenance activities for the road network, as well as for important budgeting and planning purposes for the region's road networks. As such, it is recognised that the timely and efficient reporting and subsequent processing of the collected data is required, in order to facilitate roadway maintenance and planning projects.

In terms of state of the art data collection activities and technologies, the data is usually collected by surveyors or inspectors which travel typically on roads in a vehicle and collect data. The data can be collected automatically (for example, recording of a video and associated sensor data) or manually (for example, images and inspector comments manually acquired and logged by surveyor's/inspector). Some surveyors utilize specialized vehicles equipped with an array of sensors which collect extensive datasets. Others use simple digital data collection applications which run on a smart phone and can be used in any vehicle. Some lower cost survey technologies exist today, which primarily rely on cameras or smartphones mounted on the windshield, dashboard or hood of a vehicle. They can be deployed directly in the customer vehicle or in a surveyor vehicle. There are an assortments of vehicles, tools and sensors in between. Some organizations even rely on staff with pen and paper to identify deficiencies, and manually input them into a data repository or a database, though this is more common for incident reporting and less common for digital data collection.

The surveying technologies collect vast amounts of data, which are then uploaded after the survey has been completed to a server manually through file transfer or by using wireless collection (typically Wi-Fi to reduce data transfer costs). It is recognised that the state of the art data collection technologies have a number of disadvantages. For example, such upload after completion of the complete survey task can be inefficient with respect to data storage and bandwidth usage. For example, such technologies upload image or video data together with sensor data, post completion of the data collection, to be processed on a server and produce a report. Unfortunately, due to the vast amounts of data, such technologies also require the proximity of the device to a wireless network, so that it can upload the data. For example, such state of the art technologies can also require a human based operation, such as transporting the device (whether a smartphone or a dash camera) to an area with Wi-Fi signal. For example, such state of the art technologies can also require a human operator to take further actions such as: (a) to connect to the network; (b) to launch the app; (c) to push a button; and/or (d) wait for the upload to complete. The data is then uploaded to a server, whereas it can be analyzed by a platform that can sample the video or images based on certain auxiliary sensor data, such as location data, accelerometer data, speed data, in order to analyze segments of the image and sensor data and produce the appropriate report. In the event the data disadvantageously needs to be removed from the vehicle and transferred to another location (wirelessly or physically) for processing on a server, the additional burden from this action can pose challenges related to staff (unionized work environment, additional work responsibilities, forgetfulness, or other human factor related issues). In short, the obligation of manual user interaction in order to get the collected data properly and efficiently to a server for downstream processing can be problematic, especially in larger area regions where surveying frequently would produce multiple large data sets over a period of time.

Based on the efficiency, degree of automation and/or timeliness of the data collection and subsequent processing, the technology vendors incur associated costs related to the manner of service based acquisition, uploading, processing, and reporting on the vast amount of data resident on their servers. Such costs would then have to be bundled into the service plan which is offered to the customer, as well as impact the practical frequency and amount of data collected, recognizing that the act of data collection as well as the acts of storage/processing of such data have direct costs (both financial as well as person hours).

SUMMARY

It is an object of the present invention to provide a data collection system and/or method which optimizes the data collection process through various technological means which reduces extensive data transmission and processing requirements as noted above.

The process of surveying roads today for addressing road issues is extremely costly, and many governmental and private organizations rely on dedicated staff to note issues using pen and paper. Even when equipped with digital systems, many issues are still overlooked as people have a limited capacity in their ability to collect information and log it on a timely manner.

Governmental and private organizations therefore periodically outsource surveying activities to specialized contractors. Such contractors can be extremely costly, and come equipped with specialized vehicles with complex installation of specialized sensors. Alternatively, governmental and private organizations can use providers which allow them to upload video or image data, to be processed on a remote server, to provide such reports. However, large amount of video files and images are expensive to transmit and process. The collected data can also include data from roads which are owned by other organizations, which would have to be deleted, providing further waste. The associated costs make it uneconomical to regularly inspect roads using such technologies. It also introduces an additional burden if a person is required to operate the device.

It is an object of the present invention to provide a data collection system and/or method which obviates or mitigates at least one of the above presented disadvantages.

Aspects of the invention(s) noted herewith utilizes a device equipped with sensors, camera(s) and computing/processing capabilities to collect data. The collected data, when processed together with other sources of information, could be filtered directly on the device, resulting in a reduction in the amount of data that needs to be transmitted, stored and processed on the server.

The collected data can be combined with different sources of data, such as information about GIS assets, metadata acquired from images using artificial intelligence, and data obtained from the server (such as parameters and/or updates from other devices) to optimize the data collection process such that the right data is collected at the right place at the right time. The device itself performs data processing functions, including generation of new data, helping to reduce the processing load on the server.

Finally, the data collection device works in conjunction with a server, which processes the data, stores it, and makes the collected data, along with derivative data produced by the data collection device and/or the server. The data is then organized and presented in a manner which allows the users to make better decisions about maintenance activities for the surveyed asset.

A first aspect provided is a system for generating digital images and related data as collected data along a roadway and for transmitting the collected data over a communications network to a server, the server located remotely from the system, the system comprising: a device having: at least one camera for obtaining the digital images; at least one sensor for acquiring the related data; a memory and at least one processor for executing collection instructions available to the device, the collection instructions defining operation of the at least one camera and the at least one sensor; a local storage; and a network interface for sending the collected data over the communications network to the server.

A second aspect provided is a method for generating digital images and related data as collected data along a roadway and for transmitting the collected data over a communications network to a server, the server located remotely from the system, the method comprising: executing image collection instructions by obtaining the digital images and acquiring the related data using a sensor; and sending the collected data over the communications network to the server.

BRIEF DESCRIPTION OF THE DRAWINGS

Exemplary embodiments of the invention can now be described in conjunction with the following drawings, by way of example only, in which:

FIG. 5 depicts sample GIS data and how it can be segmented by different properties and used to help and determine which data to send to the server and which data to discard for the system of FIG. 1A.

FIG. 10 depicts other examples of image processing operations that can be used in conjunction with artificial intelligence for the system of FIG. 1A.

FIG. 11 depicts flow of data from the device to an end user on a client through the internet and a server for the system of FIG. 1A.

DETAILED DESCRIPTION

Figure 1A:
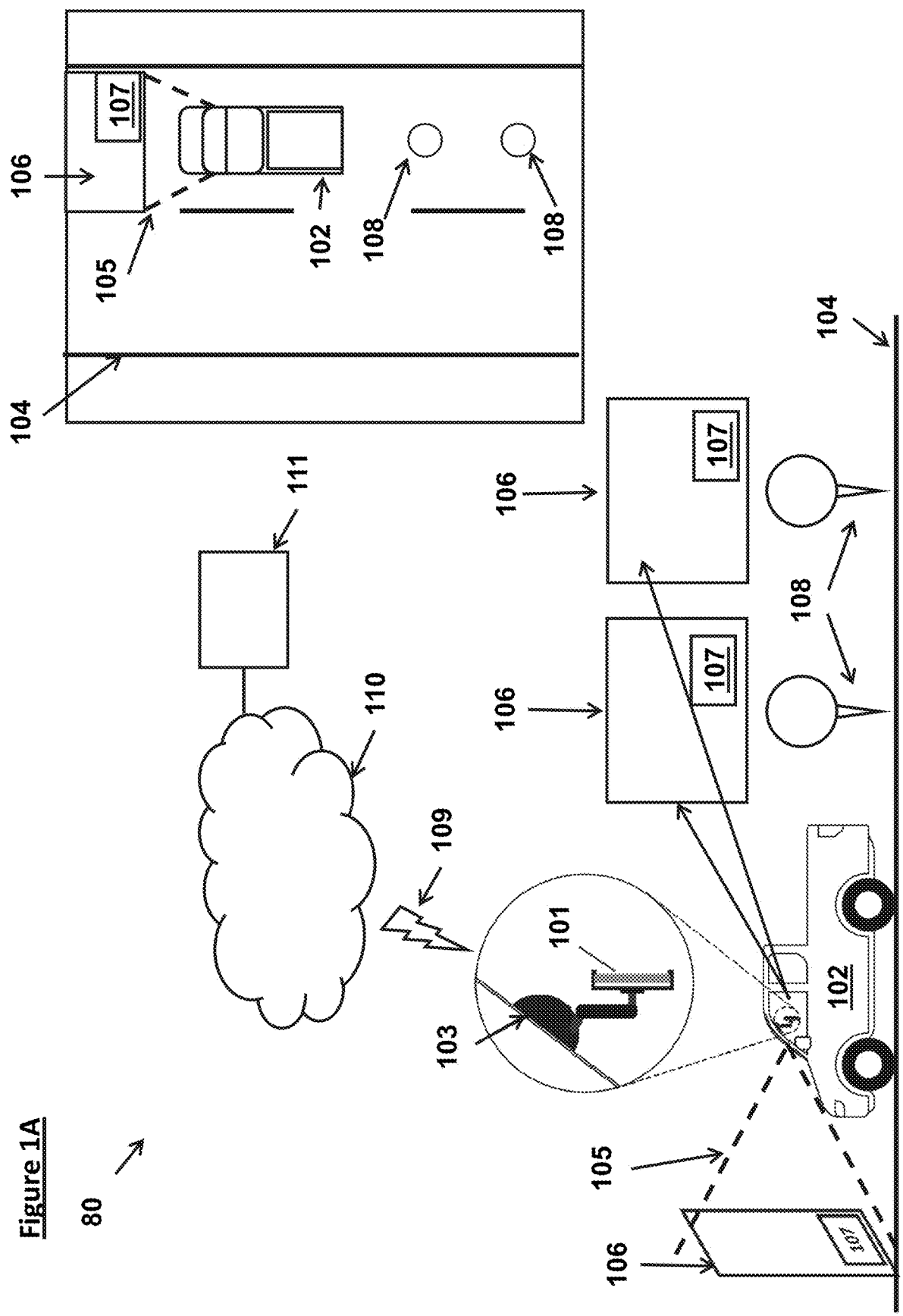
FIG. 1A depicts a system of vehicle surveying a road using a smart data capture device.

Referring to FIG. 1A, we have a system 80 including a data acquisition device 101 mounted in a vehicle 102 using a mounting component 103. The device 101 can be a smart phone 101, a smart camera device 101, or an embedded platform with an imaging component 101. The device 101 can be attached 103 to the windshield or the body of the vehicle 102. It can be attached 103 to the vehicle 102 using a suction cup, screws, adhesive, clasp, magnet, or other mechanical docking or attachment system which would attach 103 the device 101 to the vehicle 102. The attachment mechanism 103 can be either easily removable, allowing the device 101 to be transferred between different vehicles 102 or not easily removable, making the device 101 use primarily dedicated to a specific vehicle 102. The device 101 can be attached 103 internally to the vehicle 102 or externally.

While the vehicle 102 is traveling on the road 104, the device 101 collects image 106 data and associated sensor data 107 (collectively, "Collected data" or "Collected data point"). The image data 106 represents data captured within the device's 101 camera field of view 105. The image data 106 and other sensor associated data 107 could also be depicted as a data point 108 which represents the data 106, 107 captured in a specific geographic location at a specific time by a specific device (in other words each data point 108 can be associated with a time, a place, and a device 101 used to record the collected data (e.g. each datapoint 108 can also be referred to as a collected data point 108.

As such, each Collected Data point 108 includes image(s) 106 and data 107 from sensors 115. The collected data 108 is processed and/or stored by the device's 101 software before being transmitted 109 to a remote server 111 using a network such as the internet 110. The transmission optionally use encryption to secure the data as it traverses networks 110 (e.g. the internet and/or other intra/inter network(s)).

Figure 1B:
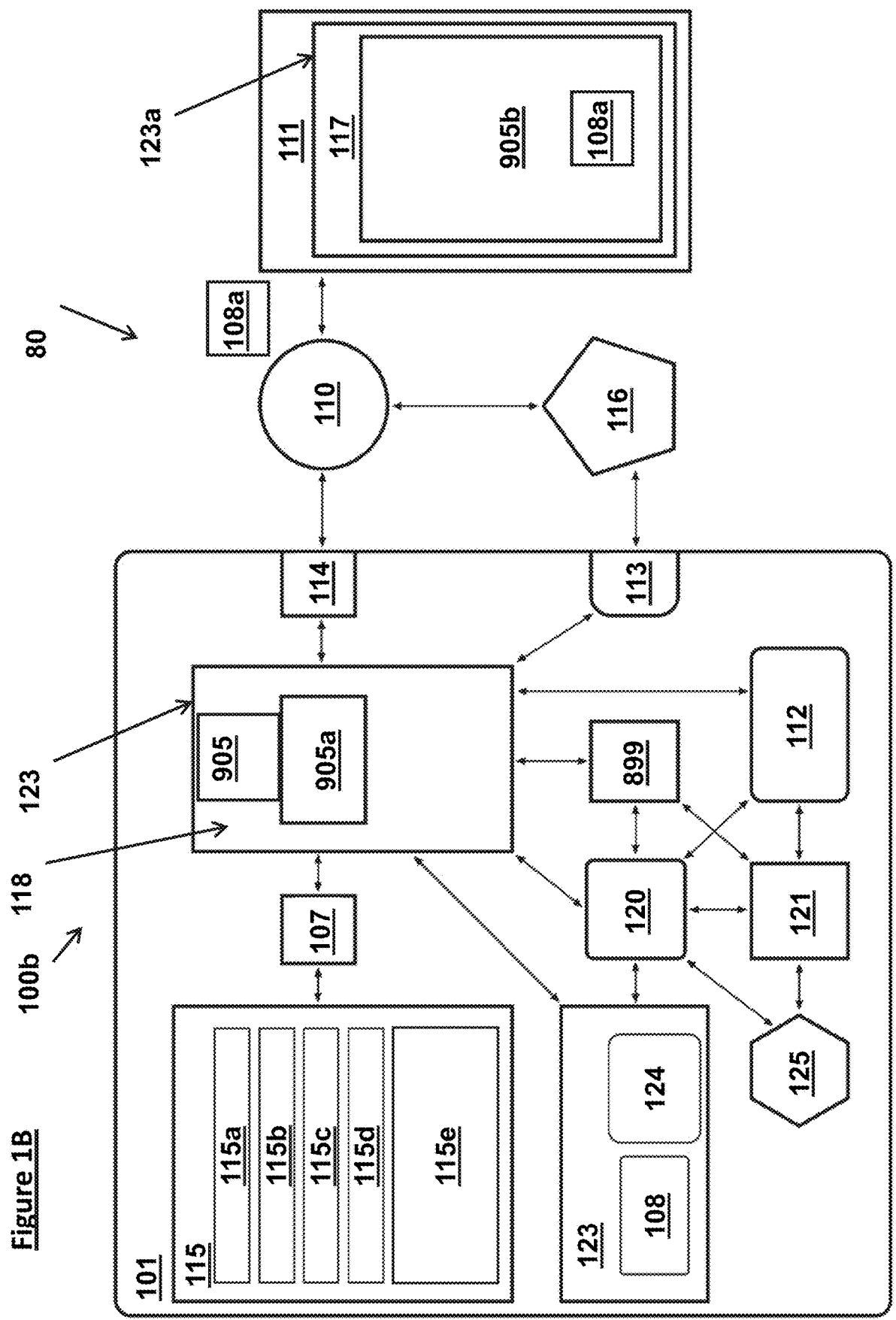
FIG. 1B depicts an embodiment of typical device components, and a way in which they are used to communicate with a server of FIG. 1A.

Referring to FIGS. 1A and 1B, the device 101 can typically include one or more camera(s) 112. The device 101 can have multiple cameras 112 with different focal lengths, image sensors and functions. Some camera(s) 112 can be geared towards obtaining a wider field of view 105 whereas others can obtain narrower field of view 105. The camera(s) can adjust the field of view 105 by using different lenses, by using a mechanically adjustable lens, or by making digital adjustments to the image 106, such as cropping. As the device 101 is collecting data 108, it can include image(s) 106 from one or more of the device's 101 cameras 112. The device 101 can collect data from multiple camera(s) 112 simultaneously. The camera(s) 112 can be internal or external to the device 101 and connected to it through a wired 113 or wireless interface 114.

The device network interface(s) 113, 114 allow the device 101 to remotely communicate with other components, devices, computers and/or servers over the network 110. The device's 101 network interface(s) can be internal 113,114 or external 116 network communication module(s) which can allow it to send and receive 109 information over a wireless and/or cellular network 110 and over the internet.

The device 101 can also typically be equipped with a variety of sensors 115 for collecting/recording the sensor data 107. The sensors 115 can include a GPS, GNSS, or other location based sensor 115a system which can rely on satellites, cellular towers, and/or internal position sensors in order to estimate the position of the device 101 using a coordinate system.

The device 101 can also collect other sensor data 115 in addition to images 106. The device 101 can include sensors such as a gyroscope 115b, accelerometer 115c, compass/magnetic sensor 116d, or other sensors 115e. The sensors 115 can be individual, fused (such as a rotational vector sensor), or integrated, such as inertial measurement unit (IMU). The additional sensors 115 can be internal to the device 101 or connected to it externally, through wired or wireless interface(s) 113,114. The device 101 can also analyze the image(s) 106 through the use of software 118 stored in a storage 123, such as by example using a processor 899 (and related hardware if applicable) for executing the software 118 instructions/code embodied as image processing instructions 118, computer vision instructions 118 and/or artificially intelligent neural networks instructions 118 in order to label the images 106 or localize and label objects within the images 106. The device 101 can use multiple sources of data 108 and/or temporal variations in data 108 to derive new data (for example, which side of the road 104 the vehicle is travelling on) as processed data 108a.

The device 101 can also conduct some or all of the following video or image 106 related functions: video or image acquisition, decoding, encoding, processing, inference (using artificial intelligence), storage, and/or transmission. It can rely on the software 118, hardware of the computing device 101, or a combination thereof. To support image or video based operations, the device 101 can typically include a Central Processing Unit (CPU) 120, Graphics Processing Unit (GPU) 121, or an integrated chipset/processor 899 with equivalent functions. The device 101 can also have additional processing components specialized in video/image functions as part of the computing platform of the device 101 shown in FIG. 1B. The device 101 can also typically have working memory/volatile memory 122, such as Random Access Memory (RAM) 122 in order for software 118 to operate.

While the current state of the art systems in the field store their video and sensor data locally until such time it can be transferred to a server once the entire survey process has been completed by the operator, which results in expansive and potentially costly data transfer requirements and server side processing, embodiment(s) of the present invention can save on data transmission 109 costs by collecting data points 108 based on different factors which can include one or more from the factor(s) of: (a) distance travelled; (b) time elapsed since last capture (by any device 101); (c) GPS coordinates; (d) objects or labels detected in images by artificial intelligence operation; (e) associated digital geospatial road asset information; or a combination thereof.

The described system 80 of FIG. 1A and associated figures can prioritize efficient data collection to be used for reporting incidents and calculating metrics, while minimizing data volume for storage and transmission 109 to server 111 using the internet 110. As such, the device 101 could use exclusively cellular network 110 connectivity, wireless network 110 connectivity (such as Wi-Fi), or a combination of the two. One or more desirable aspects of the described system 80 is that the system 80 can be used in a vehicle 102 without the need to remove the device 101, or the necessity to physically connect the device 101 to a workstation computer, network switch or a Wi-Fi access point so that the collected data 108 can be transferred and uploaded to the server 111 through internet 110. A further desirable aspect of the system 80 is the ability to prioritize the data 108 collection and/or to prioritize the transfer of the collected data 108 to the server 111 (i.e. to transfer the data 108 off of the device storage 123 for analysis or subsequent processing. It is recognised that the data 108 can be transmitted from the device as raw data 108 and/or as processed data 108a, as desired.

The device 101 can typically store the collected data 108 locally on non-volatile local storage 123 (such as disk, hard drive, solid state memory, or other types of non-volatile memory), provided as one or more storages 123, until such time that the device 101 is programmed to transmit 109 the data 108, 108a to the server 111. The non-volatile 123 memory can also typically store other files 124 including system files, application files, database files, data files or other types of files. The data 108, 108a (hereafter referred to as data 108) can be stored in an encrypted, or non-encrypted manner.

The device 101 can also include a display 125. The display can be an integrated display 125 or an external display 125. The display 125 can be used for a variety of purposes including: to display the orientation of the camera 112 (view finder), to display user interface, to display notifications or incidents, to provide access to device 101 functions or settings using a touchscreen interface, and to enable/disable/switch device 101 functions.

Figure 2:
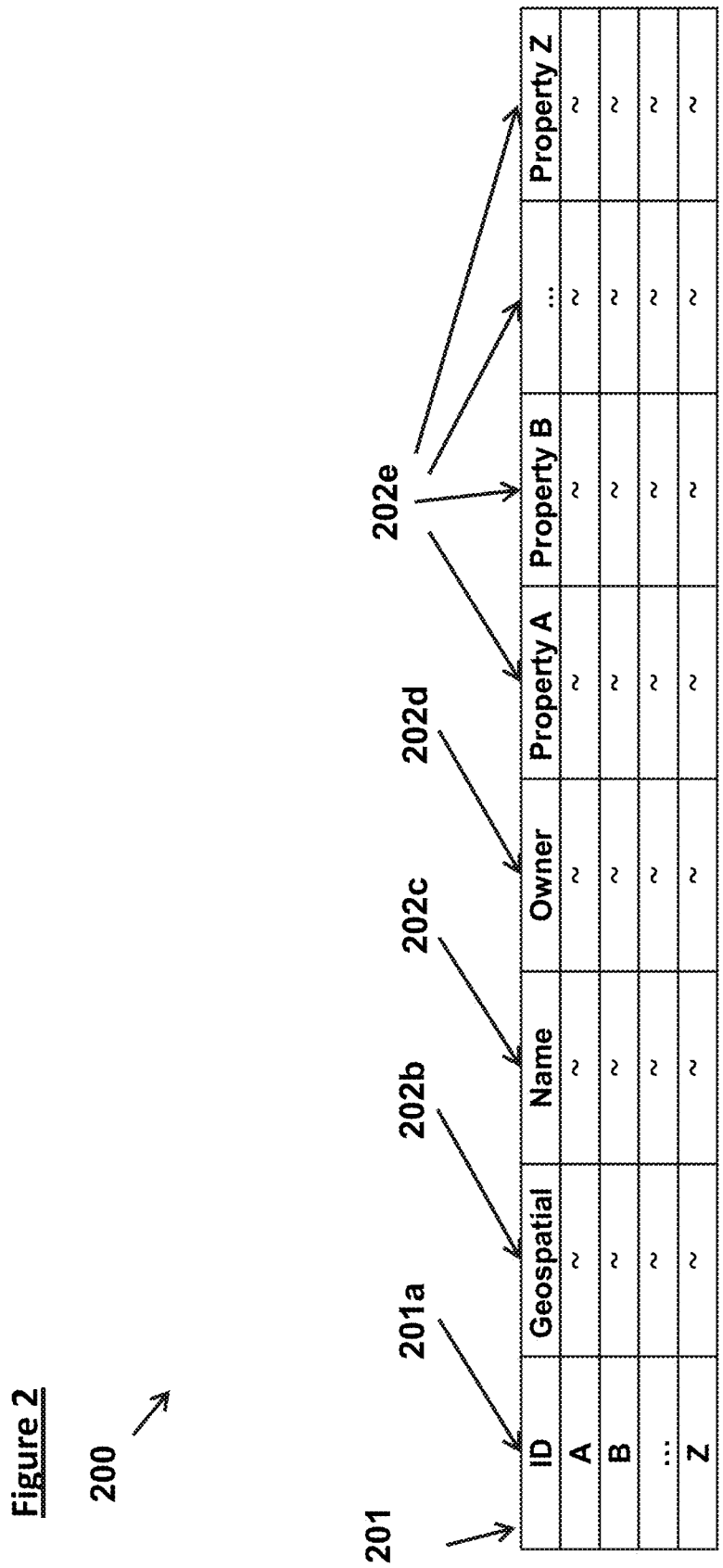
FIG. 2 depicts sample information associated with GIS data of FIG. 1A.

Referring to FIG. 2, we have a sample data set format 200 for use in organizing digitally described geospatial assets 201. The stored data also be referred to as digital assets, GIS assets, digital twins, data points, data shape, or such terms used to describe an asset in a real world on a geospatial information system. GIS Assets 201 can be depicted on a map environment in various ways, including as points, lines, polygons, multi-polygons (a group of polygons). The GIS assets 201 are typically stored for use in a database or in data file format, such as a KML, KMZ, Shape File, GeoJSON, CSV, XML, or other file format which can be used to describe an object within a geo-spatial space.

Figure 4:
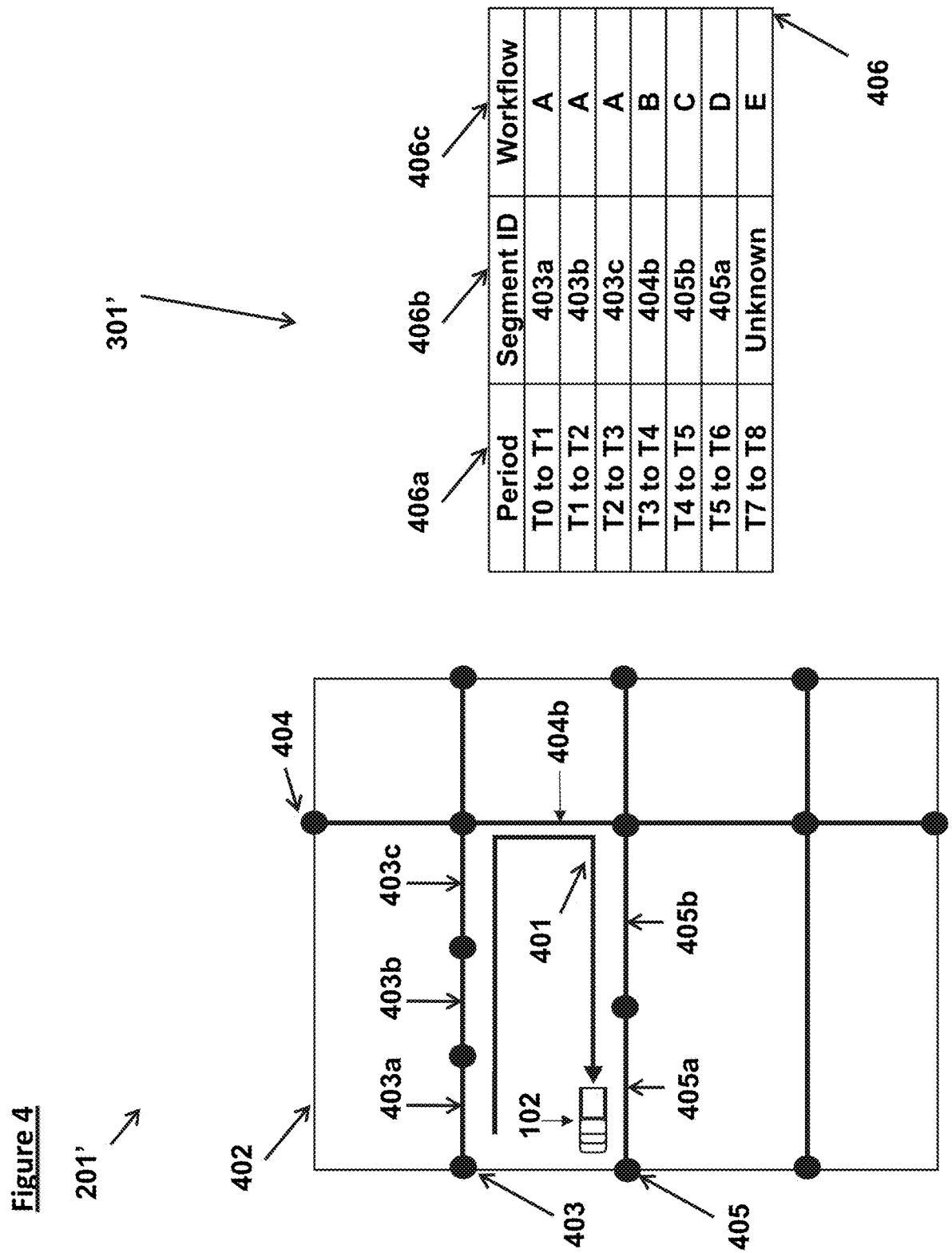
FIG. 4 depicts a sample use case in which a vehicle equipped with a device is using different software workflows on different portions of the road for the system of FIG. 1A.

It is recognised that for example, each of the digital assets 201a can be used to represent a road 403,404,405—see FIG. 4. It is recognised that for example, each of the digital assets 201a can be used to represent a road segment 403b, 403c, 404b, 405b, and 405a.

Geospatial Data 201 can have various properties as defined by the data format 200, such as:
a) ID 201a: A unique object ID which represents one of the individual assets A, B, . . . Z (e.g. road, road segment, etc.) defined in the geospatial data 201.
b) Geospatial description 202b for each of the individual assets: This field can be actually depicted as one field 202b or multiple fields 202b, depending on the type of the geospatial representation. For example, it can include individual properties or coordinates for latitude 202b and longitude 202b, or easting 202b and northing 202b. Both can be stored in one field 202b or each can have their own individual field 202b. The values contained in the field(s) 202b can include a series of points or values representing geographical coordinates which are used to describe a line, polygon, or multi-polygon.
c) Name 202c for each of the individual assets: The GIS data 201 can include a name that is used to briefly describe the respective object/asset. For example, a road could be called a "road", or "street", or "Leslie Street", or "Leslie Street, Section 1". The name field can be unique or not unique.
d) Owner 202d for each of the individual assets: The GIS Object 201 can have an owner property 202d. Using road assets as an example, in a multi-tiered governmental system, the geographical boundaries of regional or county level government can overlap with the boundaries of local municipalities. As such, some roads can be maintained and/or operated by one governmental jurisdiction, whereas other roads can be maintained and/or operated by another. Some road assets 201 can be privately owned or operated/maintained by other entities. In some areas, the state or province can also be responsible for some or all of the roads. In some areas, the federal government can also be responsible for some or all of the roads. In some areas, one government or organization can be responsible for all of the roads.
e) GIS objects 201 can also have other descriptive properties 202e for each of the individual assets. For example, a road segment object can also have properties such as the number of lanes, a type (such as highway, arterial, collector, feeder, ramp and others), governmental level (such as state/provincial/territorial, regional/county, municipal, private and others), speed limit, traffic volume, composition (such as concrete, asphalt, bituminous, gravel, dirt and others), street name, street suffix (such as avenue, road, street, lane, crescent, and others), address range, jurisdiction, and many other properties. GIS fields 202e could also include records such as inspection dates, inspection conditions and any other fields. Some of the GIS records 202e can also be updated using data collected by the device 101 and/or derivative data generated by the device 101 or the server 111.

The geospatial data 201 can represent the same object but could be described using different terminology, dialect or slang in different geographies or by different people. For example. the term roads, streets and highways can all represent the same asset object.

Figure 3:
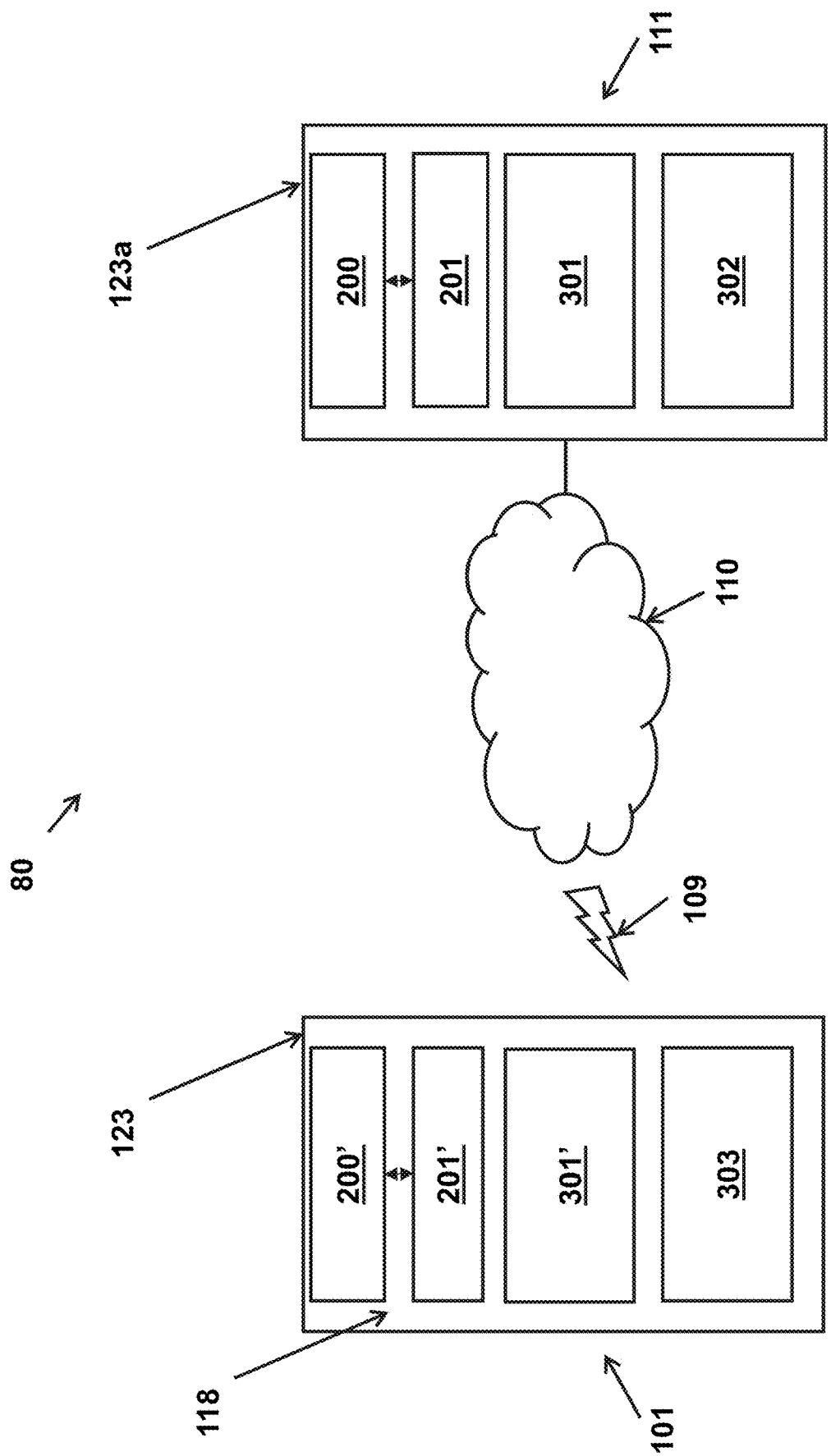
FIG. 3 depicts an embodiment of communications between a device and a server for synchronization of GIS assets data and settings of the device of FIG. 1A.

Referring to FIG. 3, and within the context of the invention, the data set format 200 for geospatial assets 201 are typically imported to a server 111 and/or stored in the server 111. For greater clarity, the term server 111 or servers 111 would be used interchangeably throughout the description of the invention. The server(s) 111 can be physical, virtual and/or cloud based. The server 111 functions can be distributed over one or more physical or logical machines in one or more geographical locations to accommodate different geographies, regulations, processing, scaling, redundancy, availability, computing, functions and accommodate other business, regulatory or IT requirements. The relationship between the server(s) 111 and device(s) 101 can be one to many, one to one, or many to many.

In general, a server 111 can have a plurality of software 117, 302 components (see FIG. 1B), including operating system(s), application(s), database(s), file(s) and other software tool(s) or component(s). The server 111 can typically have one or more database(s) 123a which can store information pertaining to the GIS data 201 inducing the data format 200. The GIS assets 201 and associated data format 200 can be stored in one or more database 123a and/or in one or more table(s) 123a. The server 111 can also store GIS assets 201/format 200 of one or more customer(s) in one or more databases 123a or one or more table(s). It can also have the data or portions of the data 201/format 200 stored in one or more file(s). The server 111 can also store configuration 301 parameters and/or settings which affect the data collection functions of the system 80 executed by the device 101 (e.g. using the sensors 115 and the cameras 112).

The device 101, by connecting 109 to a cellular network 110, wireless network 110, and/or the internet 110 can communicate with the server 111 and download and retain a copy, or a subset of, the GIS assets 201/associated data format 200 and configuration 301 parameters. The server 111 data, such as the configuration data 301 and GIS data 201 (with associated data format 200) can be accessible to the device 101 directly through a database 302 connection or through the server's 111 software 117 (e.g. labelled as 302). The server 111 software 302 can (a) generate files and scripts for the device 101 to download and process; (b) provide for communication protocol(s) or application interface(s) to access the data; or (c) a combination thereof, in particular by leveraging the data format 200 for use by the device 101 (for example as downloaded copies 200', 201' from the server 111).

Therefore the device 101 can have its own database(s) and local storage which can store data files, e.g. storage 123. The configuration data 301' and GIS data 201' and the associated data format 200' downloaded by the device 101 (from the server 111) can be stored in a database and/or in a file format in storage 123. The device 101 stored GIS assets 201',200' and configuration parameters 301' (e.g. associated parameters 406a,b,c shown in FIG. 4) can then be utilized by the device's 101 software 118, (e.g. labelled as 303) for different data collection and transmission workflows as executed by the processor 899 in collection of the collected data 108 and/or its processing into data 108a, which can allow the device 101 to optimize its computing capacity, storage capacity and/or data transfer usage. For example, the configuration parameters 301, 301' can be used to associated (or otherwise link) which workflow(s) 406c are to be applied to which GIS assets 201a (defined in the GIS data 201, 201')

The device 101 can identify whether a newer version of the GIS data 201', 200' and/or configuration data 301' is available for download based on parameters such as revision number, time stamp, sequence number, a matching key, or other parameters or programming that can help the device 101 to download the most appropriate data 201', 200', 301'. As such, the server 111 can request to the device 101 or the device 101 can request to the server 11 for updates to the data 200, 201, 301, during operation of the device 101.

The device 101 can use the GIS data 201', 200' and/or configuration data 301' as collection instructions for generating (e.g. acquiring) the collected data 108. The device 101 can use the GIS data 201', 200' and/or configuration data 301' for generating (e.g. processing) the collected data 108. It is recognised that the collection instructions can only contain the GIS data 201', 200' and/or configuration data 301'. It is recognised that the collection instructions can contain alternate instructions in addition to the GIS data 201', 200' and/or configuration data 301'. For example, the alternate instructions can include native (e.g. device operating system OS) collection and processing instructions unique to any of the hardware components (e.g. camera(s) 112, sensor(s) 115, network interfaces 113, 114, etc.). The collection instructions can be referred to as part of the software 118, 905a stored in the storage 123. Further, the collection instructions can be used to optimize the acquisition/collection of the digital images 106, the sensing/collection of the sensor data 107, and/or the sending/transmission (or not) of the collected data 108 to the server 111. It is also recognised that the server 11 has at least some control/influence over the content of at least a portion (e.g. data 201, 200, 301) of the collection instructions used by the device 101 to generate the collection data 108, 108a. The server 111 can dictate/change the content of the collection instructions before operation of the camera 112 and the sensor 115 used to generate the collection data 108. The server 111 can dictate/change the content of the collection instructions during operation of the camera 112 and the sensor 115 used to generate the collection data 108. The server 111 can dictate/change the content of the collection instructions after operation of the camera 112 and the sensor 115 used to generate the collection data 108.

For example, the server 111 could send update data 200', 201', 301' to the device 101, in order to change or otherwise modify any of the manner(s) in which the device 101 is collecting the data 108. For example, the update data 200', 201', 301' could be used to change/modify the workflow 406c (see FIG. 4, e.g. type of camera 112 used, amount/type of data 108 to collect, which road or road segment to collect data 108 for or not, etc.) used by the device 101 for a selected road/road segment defined in the data 201'. It is recognised that the server 11 can be dynamically analysing/monitoring (e.g. on the fly or otherwise in real time) the data 108 as transmitted to the server 111 by the device 101 as the device 101 is driving along a route 401. In certain cases, the result of the analysis (e.g. an unanticipated change in road conditions, change in weather conditions, image quality, frequency issues, etc.) can cause the server 111 to send the update data 201',301' (e.g. only the GIS data 201', only the configuration data 301', or a combination thereof) to the device 101, in order to change the manner and/or location in which the device 101 is collecting the data 108.

FIG. 4 shows by example different possible programming and functions of the system 80 as a route 401 is taken by a vehicle 102 equipped with a data collection device 101 on a road network 402. The device 101 has access to a digital representation of the road network 402, which is stored on the device as GIS data 201 (e.g. using the data format 200). The road network 402, in this example, includes/defines via the GIS data 201' three roads on which the device 101 is operated on, labelled as roads 403,404,405. The roads 403, 404,405 can be further broken down to one or more road segments 403b, 403c, 404b, 405b, and 405a (e.g. a road segment can be defined as a section of the road that is identified uniquely in an asset registry/list/database/repository including a respective geospatial features assigned to each of the road segments, such that the road segments can be differentiated from one another using the respective features assigned). By a way of example the vehicle 102 route/trip 401 depicted in the FIG. 4 shows the trip starting on road segment 403a, and continuing through road segments 403b, 403c, 404b, 405b, and 405a in sequence. In the example of different workflows 406, we note different workflows 406c which take place on different times 406a on different time segments 406b.

In this manner, the device 101 can use the data 201', 301' to control how the data 108 is collected (e.g. which components of the device 101 are used and/or in which manner of use of the designated components), for example using the specified route 401 and associated workflow(s) 406c of FIG. 4. It is recognised that the workflows 406c can be associated on a road (or road segment) basis. It is recognised that the workflows 406c can be associated on a temporal period(s) basis for each road (or road segment).

As the device 101 is travelling on the roads 402, the device's 101 software 118, utilizes the device's 101 location sensor 115 to determine the geographical or geospatial positioning coordinates 107. The location coordinates 107 can then be used by the device's 101 software 118 to identify the most likely road segment (or generally which road) on which the device 101 is positioned out of a list of road segments (or generally which road) in its GIS dataset 201', based on a comparison of the location data 107 with the geospatial location data of the road segments (or generally which road) stored in the GIS dataset 201'. In addition to the location information 107 and GIS dataset 201', the road (or generally which road) segment association can also rely on configuration information 301', geospatial operations, mathematical operations, algorithms, temporal data, other sensor data 107, derivative data and/or a combination thereof to determine by the location comparison the most likely road segment (or generally which road) on which the device 101 is positioned. The result of the associated road segment (or generally which road) analysis/comparison can also be that the device 101 is not on any road 402, e.g. by not obtaining a road (e.g. segment) match via the comparison or example, by excluding road segments (or generally which roads) when the distance between the GPS coordinates 107 and the associated road segment 406b coordinates (or generally which road coordinates) in the GIS data 201' is greater than a certain threshold. For example, if the trip 401 ended on a parking lot off the road near road segment 405a, the software 118 can determine that the device 101 is no longer on the road segment, or otherwise on an unknown road.

The device's 101 software 118 can analyze which road segment (or generally which road) (via comparison of the location data of the device 101 and the road segment(s) information) the device 101 is on (a) continuously; (b) periodically, based on a programmed interval; (c) periodically, based on distance travelled; and/or (d) based on an algorithm utilizing some or all of a, b and c (as well other potential parameters).

As the device 101 travels across the different road segments 403a, 403b, 403c, 404b, 405b, 405a, the device 101 software 303 can utilize some of the various fields within the road segments (or generally which road) GIS data 201'. Fields within the road segments associated data 201' a,b,c, d,e (or generally which road) could then be used to (a) launch different data acquisition workflows 406c within the software 118; (b) be used to specify different conditional statements or cases within a software 118 workflows 406c; (c) load different parameters based on the GIS data 201' fields, configuration parameters 301' or both; and/or (d) a combination of all of the options. As such, it is recognised that the device 101 as configured can leverage the data 201', 301' in order to determine which of a plurality of data acquisition workflows 406c the device 101 can follow (for example also specifying which parameters/conditional statements/cases to follow in association with the selected/specified workflow(s) 406c) when operating the sensors 115 and/or cameras 112 and/or other hardware/software functions.

Examples of different workflows/conditions 406c for different road segments (or roads) as determined by the geolocation analysis (e.g. comparison) can include one or all of the following:
a. Whether to acquire data 108 or not acquire data 108 based on a value contained in the GIS data 201' field of the associated road segment (or generally which road).
b. Whether to change the rate of data 108 acquisition based on a value contained in the GIS data 201' field of the associated road segment (or generally which road). For greater clarity, rate means the number of data points 108 collected within a set period of time or within distance travelled by the vehicle 102.
c. Whether to change the quality of data 108 acquired based on a value contained in the GIS data 201' field of the associated road segment. For greater clarity, quality means image quality (such as image resolution and image compression), or location reading quality (such as location reading precision, accuracy, or resolution).

In addition to the GIS dataset fields 201', the workflows or software 304 conditions can also rely on: configuration information 301' including geospatial operations, mathematical operations, algorithms, temporal data; location information 107; and other sensor 115 data, derivative data or a combination thereof, which can affect the device's 101 data collection activity, rate and/or quality. For example, the presence of sensor 115 data, such as the indication of a road under current maintenance, weather conditions, light level conditions, traffic conditions, etc., can be a cause or trigger for a change in the GIS dataset fields 201' and/or configuration information 301' used by the device 101 to collect (or not collect) the data 108.

The sample use case displaying different programming 406 where different workflows 406c are used on different road segments (i.e., differentiated/identified by road segment ID) 406b in different times/periods 406a associated with each of the road segment IDs 406b as the device 101 is travelling 401 along the different road segments 403a, 403b, 403c, 404b, 405b, 405a, and off-road/unknown road. In the example workflow operations 406 provided, five different software 118 workflow variants 406c (e.g. Workflow A, Workflow B, Workflow C, Workflow D, Workflow E) take place throughout the trip 401.

Referring to FIG. 5, we depict a visual representation of a sample GIS dataset 201 (in FIG. 5 referred to as dataset 500) that is composed of multiple GIS object types, including road segments 501 GIS Data geospatial boundary shape(s) 502 (also commonly referred to as a geo-fence or geo-zone).

A geo-fenced zone 502 is typically a shape or a polygon that represent the boundaries of a region of interest within a geospatial system. In the context of the invention, a user of the system 80 can only want to (a) collect data, or exclude collection of data, within a geo-fenced zone 502, (b) to have different workflows 406c within different geo-zones 502; or (c) a combination thereof.

As one example in the context of maintenance of roads, a governmental organization (for example, regional, county, local, single-tier or other types of governments) can only want to capture data within the boundaries of its jurisdiction in order to minimize costs associated with capturing and processing data 108 outside of its boundaries via an appropriately assigned workflow 406c. In another use case of the system 80, a user can want to capture data "off-road", meaning in areas which do not have road segment 501 representation (e.g. as embodiments of road segments shown in FIG. 4), for example, user owned parking lots.

The initial GIS dataset 201 (also referred to as 500 in FIG. 5 as an embodiment) is typically stored on a server 111 and can include one or more types of Geospatial dataset(s) 201 that help to determine where to capture data 108. The server 111 can create a subset 201' of the GIS dataset(s) 201 for local use by the device 101 order to minimize data transmission costs and reduce the storage, processing and computing requirements on the device 101 during real time operation of the device 101. Alternatively, the server 111 can communicate in real time (or whenever connectivity allows) the GIS dataset(s) 201 over the network 110 for use by the device 101 in situations where data transmission costs and storage, processing and computing requirements on the device 101 during real time operation of the device 101 are not an issue (e.g. are not practically limited due to system 80 operational constraints and/or costs).

For example, the device 101 can download 109 the local GIS dataset 201' or the server can upload 109 the local GIS dataset 201' to the device 101. The GIS dataset subset 201' can exclude (or include) certain road segments 501 based on the values of their property fields. It can also exclude (or include) certain properties associated with the road segments 501 which are not likely (or likely) to be used locally within the device 101.

From a workflow perspective, the road segments 501 could have different properties (e.g. properties 202e—see FIG. 2) which would facilitate the device 101 to determine on which road network segments 501a,b,c,d,e to collect data, and in which manner. For example, road segments can have associated fields 202e that define the traffic volume that they carry, the number of lanes, the type of a road (arterial, feeder, local, regional, county, highway, and other types), along a plurality of additional fields. In some cases, different roads within the same geographical area can be operated or maintained by different legal entities in the public sector or private sector, all of which can be defined in the fields 202e. As such, the device 101 can use the GIS data 201,201' to determine (for example what, where, why and/or how) the operation of the vehicle 102 (e.g. speed and/or location) as well as the sensor(s) 115 and/or camera(s) 112 and/or workflows 406 related to the processing/storage/transmission of data 108.

The device 101 can collect data 108 for two separate legal entities simultaneously if it is configured 301' to do so. For example, in a road network as defined in the data 201', there can be private roads 501e, local government level roads 501d, regional or county level roads 501c, state/provincial/territorial roads 501b, and federal roads 501a. As the device 101 is travelling within a certain geographical area, the device 101 can then, for example, collect data 108 only on roads 501c (for example county government roads) and roads 501d (for example local roads) based on an ownership or maintenance property. The device 101 can be programmed not to collect, or to discard 503 (and thus not transmit 109), data 108 on roads which it is (or not) programmed to acquire data 108 on (in this example, 501a, 501b, 501e). The GIS data 108 as defined 201' and/or configured 301' to be collected can then be transmitted 109 to the server 111 and be made available to users/customers. As such, the device 101 can utilize the data 201', 301' (locally stored and/or transmitted in real time by the server 111 or by other devices 101) to direct operation of the data acquisition process 108 and/or camera 112 and/or sensors 115, as the vehicle 102 is on the route 401.

Figure 6:
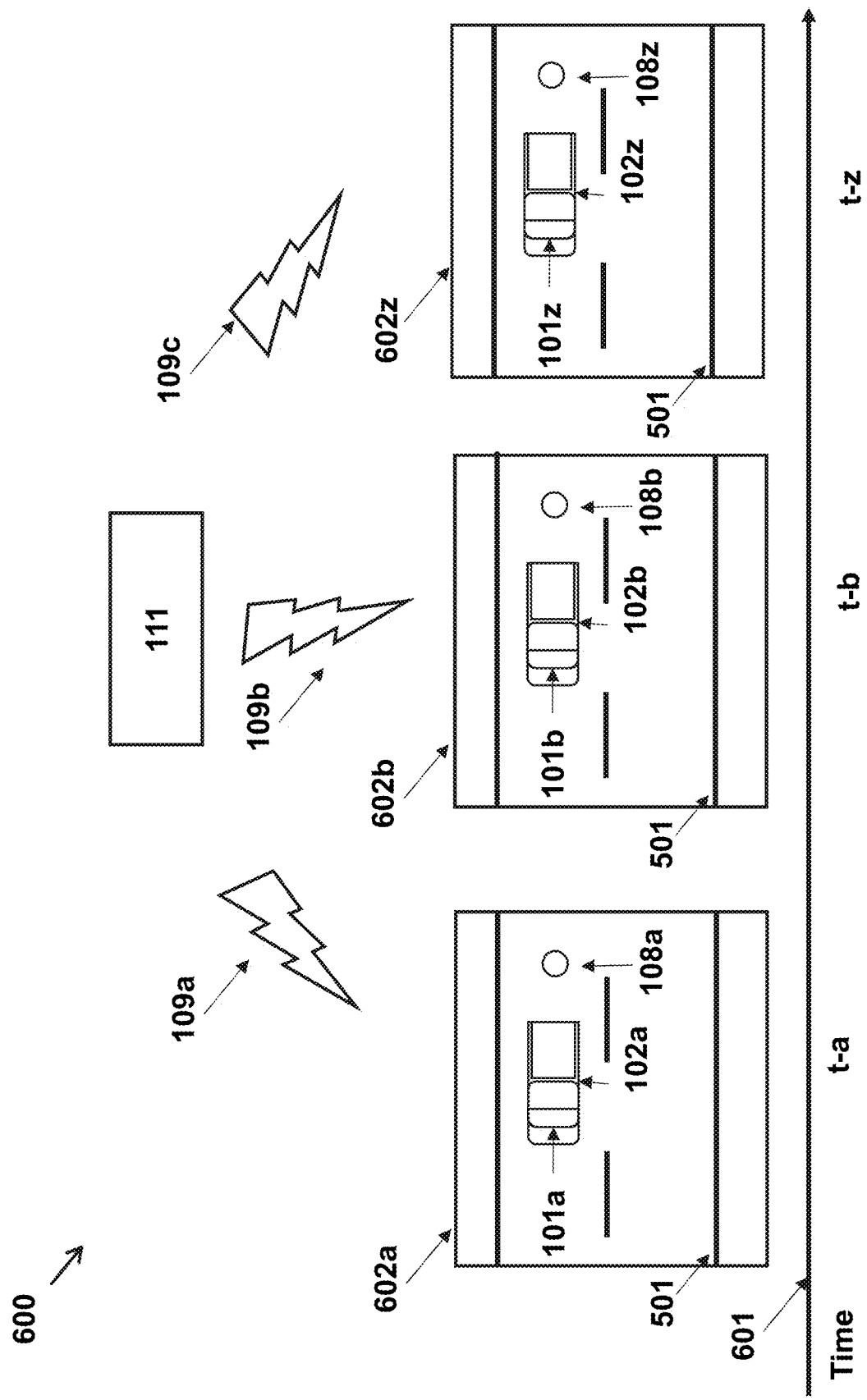
FIG. 6 depicts sample scenarios relating to surveying a road at different points in time and how it can affect the data collection process for the system of FIG. 1A.

Referring to FIG. 6, provided is a sequence of events related to acquiring data on an embodiment of a road 600 (an embodiment of the route 401 of FIG. 4). Over a certain timeline 601 (e.g. defined period 406a), a sequence of events 602a,b,z (e.g. defined workflow 406c) at different points of time t-a,t-b,t-z where a vehicle 102a,b,z equipped with a device 101a,b,c is collecting data points 108a,b,z on a specific road segment 501. The device(s) 101 communicate 109a,b,c with the server 111 in the course of operation.

A device 101, installed in a vehicle 102, travelling over a section of a road 600 at a given point of time 601 can or can not collect data 108 including image 106 and sensor 115 data based on the specified (in data 201', 301') workflows 406c, the device 101 configuration, and the parameters which are associated with the road segment 600 (also specified in the data 201', 301'). The device 101 can or can not also store data 108 based on the workflows 406c specified. Finally, the device 101 can or can not communicate 109 with the server 111 or with other devices 101 to determine which data points 108, if collected, are to be transmitted to the server 111, partially or in full. The workflows 406c can rely on GIS position data information 115 and connectivity information (whether there is a suitable connection with the server 111 over the network 110), in order to determine whether to collect and/or transmit the data 108.

For example, each road segment 501 (see FIG. 5) can have a property field in the data 201', which determines how often collection of data 108 of the road segment 501 needs to be performed/updated (either directly associated with the road segment 501, or indirectly, through a configuration 301' parameter associated with a road segment property in the data 201'). The field can be directly related to a surveying interval (e.g. data 108 collection period), or can be a field which is associated with a workflow 406c rule which is using the field data, together with other parameters 201',301' to determine the data 108 acquisition frequency. The update interval can be constantly or in different increments of seconds, minutes, hours, days, weeks, months or other units of time. Certain roads 501, with high volume of traffic or with ongoing works can require more frequent updating of its GIS dataset 108, whereas other roads, can require less frequent update of its captured data 108. Over time, the same device 101 can survey the same road segment 501 in different intervals of time t-a,t-b,t-z, for example.

In FIGS. 5,6, it could be that at two different points of time t-a, t-b, the same vehicle 102a,102b with installation of the same device 101a,101b is travelling on the same road segment 501. In its first trip 602a the device 101a can capture data 108a, whereas on its second trip, 602b, the road 501 might not be due for data collection and as such, the acquisition data 108b is not collected and/or not saved. In this manner, the collection of the data 108 can be efficiently streamlined (either in its time, location, and/or quantity, and/or quality/resolution), as well as the amount of data 108 actually uploaded 109 (or discarded 503 or locally stored) by the device 101a,b when in operation as dictated by the data 201',301'.

It could also be that at two different points of time t-a, t-b, as defined by the data 201',301', the same vehicle 102a,102b with installation of the same device 101a,101b is travelling on the same road segment 501. In its first trip 602a the device 101a can capture data 108a, whereas on its second trip, 602b, the road 501 is due for data collection and as such, the acquisition data 108 is collected or saved.

It could also be that at two different points of time t-a, t-z, a vehicle 102a with a device 101a is travelling on a road segment 501 making a first trip 602a. Whereas at a later point of time t-z, a different vehicle 102z with a different device 101z makes a separate trip 602z. In such case the device 101z can or can not capture data 108z, and can or can not save the data 108z, depending whether the road 501 is due for an updated set of data 108z, as defined by the data 201',301' utilized by the respective device 101a,101b (and/or vehicle 102a,b).

The process of optimizing data transfer 109 between the device 101 and the server 111 can typically involve some level of analysis from the server 111. For example, the server 111 can keep records of which road segments 501 were traversed and when t-a,t-b, t-z. It can also keep records of derivative data, such as when the road segments 501 are due for data 108 collection. In this manner, the server 111 can decide whether to send update data 201', 301' to the device 101, in order to modify or otherwise change the operation of the device 101.

The device 101 and the server 111 can be aware of whether a road is due for an inspection/data collection through a two-way synchronization of the device's 111 data 201' with the server's data 201. For example, the device 101 can communicate to the server 111 which road it is on (or the GPS coordinates which allow the server 111 to derive same), and the server 111 would then update the appropriate fields in its asset database 201 and determine whether the road 501 is due for an inspection/data collection. The server 111 can then notify the device 101 whether to collect and/or send the data 108, for example by sending revised/update data 201', 301' to the device 101 as a replacement of the current data 201',301' stored in the device 101.

In another embodiment of the system, the devices 101a, 101b,101z would all be subscribed to each other's communications 109a,109b,109z using a publish-subscribe network protocol that transports messages between devices 101a, 101b,101z. Example of such a protocol is MQQT, which is an Internet of Things (IoT) light-weight protocol. The protocol typically uses TCP/IP; however, any network protocol that provides ordered, lossless, bi-directional connections can support MQTT. It is designed for connections with remote locations where a "small code footprint" is required or the network bandwidth is limited. In such public-subscribe implementation, all the devices 101a,101b,101z would be able to determine each other's where-about/geo-location, and determine on an individual basis whether data 108 should be collected by the respective device 101a,101b, 101z. For example, one device could determine when/where data 108 was collected/transmitted 109 by another different device, and as such the one device could determine upon consultation with the data 201',301' and updates from other device(s) 101 that further data 108 collection/transmission for that time period/location is not required by the one device (e.g. effectively informing the one device that the respective data 108 for the particular asset 201', 301' was already collected by another device 101). For example, one device could determine when/where data 108 was not collected/transmitted 109 by another different device, and as such the one device could determine upon consultation with the data 201',301' and updates from other device(s) 101 that further data 108 collection/transmission for that particular asset 201', 301' for the time period/location is required by the one device (e.g. effectively updating the device's 101 own database/files/settings 201',301' that collection for the when/how defined in its respective data 201', 301').

The connectivity 109a,b,z of the devices 102a,b,z at different points in time t-a,t-b,t-z and at different locations can not be guaranteed, for example based on device network 110 usage (e.g. loss of connection, bandwidth issues, cellular/wireless coverage, etc.). As such, when connectivity 109a,b,z is uncertain, the devices 102a,b,z can collect and store data 108 locally on a non-volatile data storage 123, until such time that connectivity 109a,b,z can be restored and the device can determine whether to transmit 109a,b,z the collected data 108 to the server 111.

Figure 8:
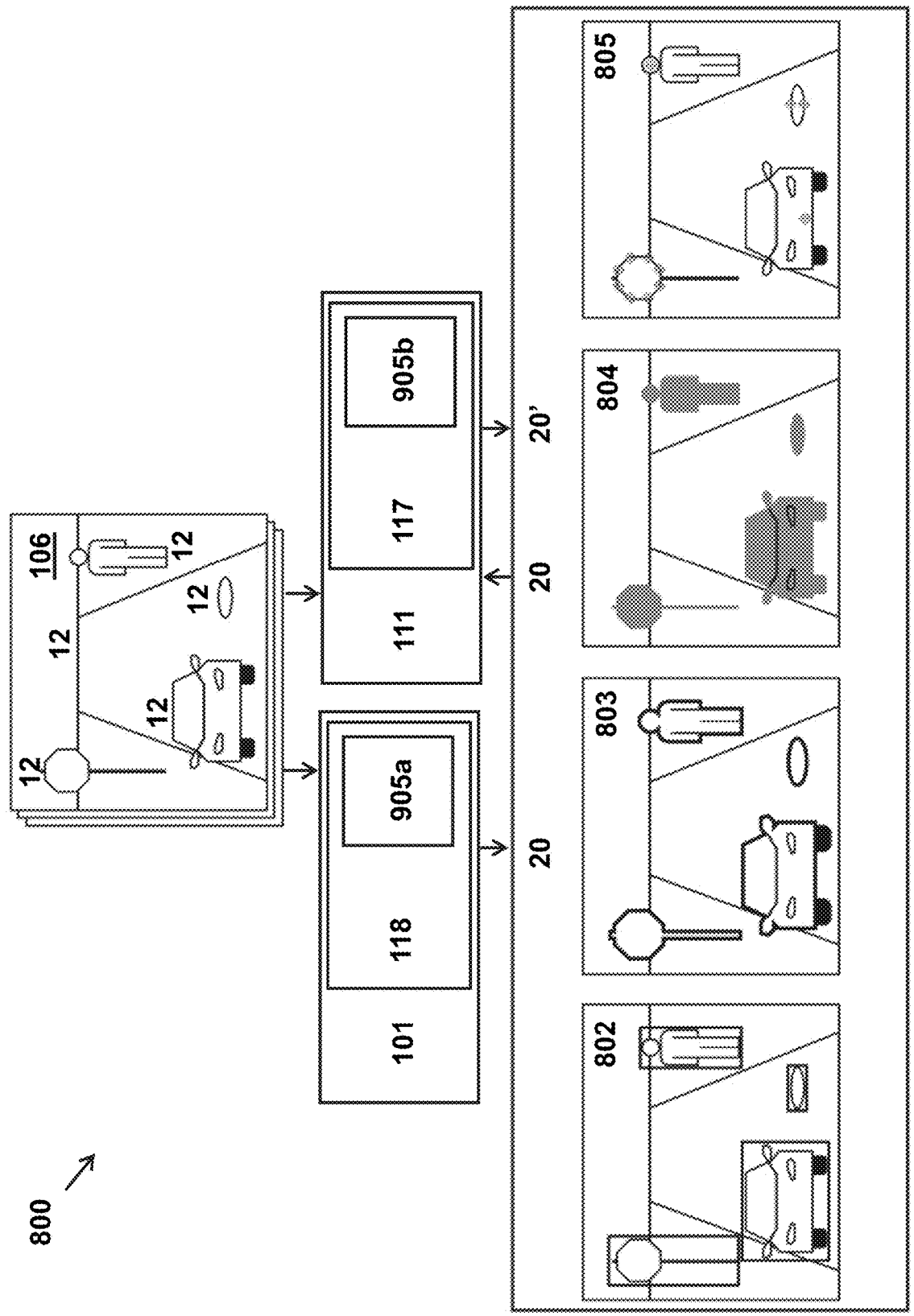
FIG. 8 depicts data which can be generated by artificial intelligence operations on images on the device and the server, and examples of different types of data which can be collected from images for the system of FIG. 1A.
Figure 9:
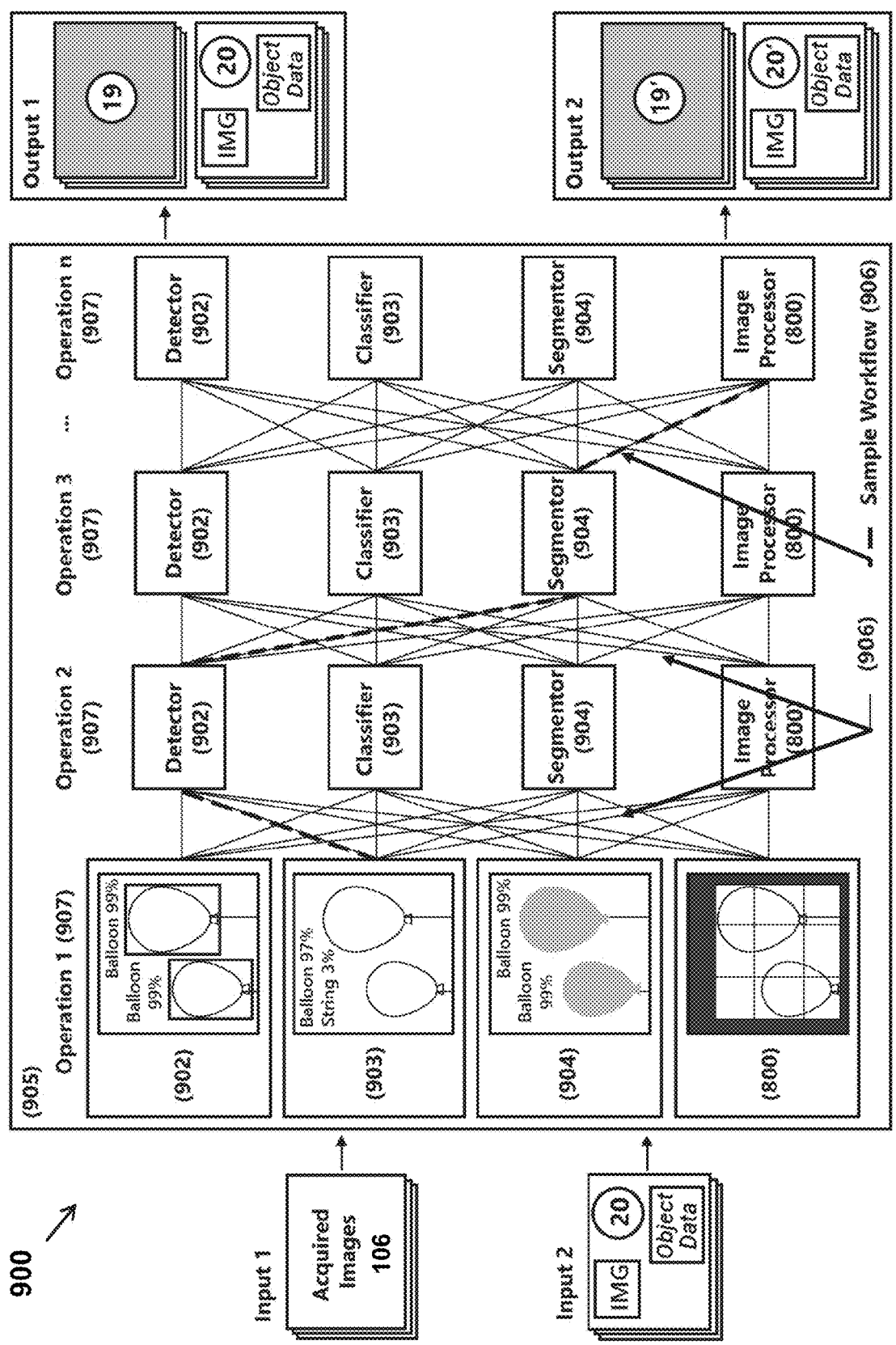
FIG. 9 depicts image processing and/or artificial intelligence operations and workflows, and how they can be used to generate new data and discard data for the system of FIG. 1A.

Referring to FIGS. 8 and 9 and 10, the software 117,118 can include image processing steps 800, artificial intelligence 905, 905a,b, and/or other processing 1000 (e.g. some or all of which could be specified or otherwise defined in the data 201', 301', as desired). For example, the instructions 800, 905, 905a,b, 1000 could be explicitly included in the workflow 406c contents 406. For example, the instructions 800, 905, 905a,b, 1000 could be implicitly referenced or otherwise linked (e.g. as called subroutines) in the workflow 406c contents 406. As such, the contents 406 of the workflows 406c can explicitly include the commands/codes of the steps 800, artificial intelligence 905, 905a,b, and/or other processing 1000. Alternatively, the contents 406 of the workflows 406c can implicitly include only a reference to one or more of the commands/codes of the steps 800, artificial intelligence 905, 905a,b, and/or other processing 1000 stored external to the contents 406. For example, the content 406 of the workflows 406c can specify the order of the operations 907 but not the operations 907 themselves, see FIG. 9. For example, the content 406 of the workflows 406c can specify which of the operations 907 to use by name/reference but not the actual operations 907 themselves, see FIG. 9.

The software 117,118 execution can take place on the server 111, the device 101 or both. The system 80 can execute the software instructions 117,118 e.g. (including the artificial intelligence neural network(s) 905a,b) for AI analysis of image data 106, sensor data 107, or a combination thereof 108, including object detection 802, 902, image/object classification 903, instance segmentation 904, 804, polygon outline 803, key-point 805 identification, and other image processing steps 800 of image data 106 and objects of interest 12 in the acquired images 106 in order to infer (e.g. determine) what object(s) 12 are present in images 106, the position of the object 12 in the images 106 and/or other characteristics of the object 12 and/or image 106. As a result of the software 117,118 steps and image operations 905a,b new image data 20 (e.g. data 106) and AI metadata 20' (e.g. including data 107) (e.g. collectively referred to as processed data 108a—see FIG. 1B) can be generated. It is recognized that to optimize data 108 transmission, it can be preferable to perform AI operations 905a on the device 101, so that the resultant data 20, 20' (e.g. collectively referred to as processed data 108a) could be used to determine whether to discard 503 or transmit 109 data 108, 20. It is further recognized that the device 101 can not have sufficient processing capabilities via the processor 899 and as such, depending on a variety of factors, including the hardware capabilities and the surveying (e.g. collection) functionality of the device 101, AI processing functions 905b can also take place on the server 111 to supplement the device's 101 surveying functions. As such, it is further recognized that the AI operations 905 can take place on the device 101, the server 111 or both.

Referring to FIGS. 8 and 10, image steps 800 can also include non AI related image processing 1000 (e.g. some or all of which could be specified or otherwise defined in the data 201', 301', workflows 406 and/or the device 101 programming 117 as desired). Image pre-processing 1000 is the process of manipulating and/or adjusting the image 106 data acquired by the camera 112 to ensure that the data received for neural network 905 processing is inputted in a way which can optimize the results and performance of AI operations 907 (i.e. optimize the quality and quantity of the resultant image data 20).

For example, using the software 117,118, a resolution for the image 106 data can be selected from one of the camera's supported resolutions 1001. The camera resolutions 1001 can be represented as a name, such as 8k, 4k, 1080p, 720p, HD, or other common names. It can also be represented as a resolution, representing the number of pixels and typically in a format of width×height, for example 7680×4320, 3840×2160, 1920×1080, 1270×720, or other resolutions. In many instances, neural networks 905 can be optimized to accept images 106 in certain resolution, typically referred to as "input shape". For example, an image 106 can be acquired by the camera 112 at a resolution of 1080p (1920 pixels× 1080 pixels). However, the neural network 905 model can be trained on images 106 scaled down to the size of 300 pixels×300 pixels. The software 117,118 then needs to resize, or adjust the resolution 1001 of the image 106 dimensions from 1920 pixels×1080 pixels to 300 pixels×300 pixels in order for the neural network 905 to process it appropriately. The neural network 905 model can have a different input shape than 300 pixels×300 pixels it can be higher (for example, 600 pixels×600 pixels) or smaller (for example, 224 pixels×224 pixels). Typically, the larger the model "input shape" or resolution, the slower the images 106 can be processed, however the larger the "input shape" resolution is, the more details can be retained in the image 106 which can increase the model's effective detection parameters, such as accuracy, recall, precision, f-score and other such metrics.

The software 117,118 can also facilitate for a field of view adjustment 1002, the field of view adjustment 1002 can be optical zoom level adjustment, if supported by the peripheral camera 112 of the device 101. If further magnification is required to calibrate the camera's 123 field of view, the digital zoom level can be adjusted through the software 117,118 to achieve the desired optimal field of view. The software 117,118 can also select from a variety of internal camera(s) 123 or external camera(s) 123 in order to adjust the field of view 1002. Different field of view can be optimal for different use cases on vehicle(s) 102. For example, the height and pitch in which the camera 1000 is mounted can be different for a bus, a service truck, or a sedan, and can require different zoom levels in order to cover the same number of lanes. Similarly, different field of views can be preferred for different objects 12.

The software 117,118 can also facilitate for cropping 1003 parts of the image 106. Cropping the image 106 allows to omit areas which typically do not require neural network 905 processing. For example, if the camera 112 is mounted on a windshield, the top 20% of the image 106 can typically be the view of the sky, whereas the bottom 10% of the image 106 can be a view of the hood of a vehicle 102. By cropping parts of the image 106 which are not relevant, those areas are less likely to generate false detections 12 or false incidents 12. In addition, in the event that the neural network 905 "input shape" is lower than the acquisition resolution, by cropping out irrelevant portions of the image 106, less detail is lost in the resizing operation of the image 106. Cropping 1003 can also be used for extracting a portion of an image 16 for additional image processing and/or inference activities 905. For example, a car can be detected 12 by a neural network 905 and then cropped from the image 106. The cropped car can then be either redacted or processed through a neural network 905 that is trained to identify license plates in a picture 106. Operations related to redaction such as personally identifiable information redaction, such as pixel substitution or blurring, are also considered image processing operations as performed by the software 108 and related instructions 905.

In the event that the image 106 data acquired by the device's 101 camera(s) 112 is in a format that is not compatible or optimized to be used with the neural network 905 architecture or library, color space conversion 1004 can be required. Examples of color spaces include YUV, RGB, HSV, HSL, CMYK and others. Even within color spaces, there are variations in the container, structure, channels, order, format, decimal system which can require conversion. For example, a file can be represented in bytes, words, or hexadecimal. Another example is that RGB channels can be ordered as BGR. Another example is that extra channel can be present to represent transparency (RGBA).

Referring to FIG. 9, shown is an example of image processing system 900 implemented by the software 118 (including the image processing instructions 905—e.g. some or all of which could be specified or otherwise defined in the data 201', 301', as desired) on the acquired images 106, in order to produce the processed image data 20 to be included with the AI data 108 transmitted to the server 111. It is also recognized that the example of image processing system 900 implemented by the software 117 (including the image processing instructions 905) on the resultant image data 20, in order to produce the processed image data 20' to be included with the received sensor information 107 stored in the storage by the server 111.

The software 117,118 can include image instructions 905 (e.g. including artificial intelligence neural networks 905), for image 106 processing and inference for flexible workflows 906 inclusive of neural network(s) 905 inference operations 907 (e.g. operations/actions as part—explicit or implicit—of workflows 406c containing multiple operations 907 and their sequencing/ordering with respect to one another—see FIG. 4) including detection 902, classification 903, segmentation 904, and other AI operations 800 or image operations 1000 in order to discard data 19, 19', as well as the resultant processed image data 20, 20'. For greater clarity, in the context of this invention, discard data 19,19' can be full images 106, or portions of frames 106 deemed by the AI 905a and software 118 to not be worthy of storage 123, transmission 109, or further processing by the software 117,118.

It is recognized that the workflows 906 (e.g. workflows 406c either containing explicit or implicit content 406) can include a plurality of different numbers/combinations of the operations 907 in any order, as configured in the image processing instructions 905, in order to identify, classify, segment or run AI analysis on any of the image(s) 106 under consideration. Other image processing operations can include cropping, color space conversation, resizing, or other AI functions (for example, key point/landmark identification). One image 106 can have several different workflows 906 applied to it. The object(s) 12 of interest are also referred to as classes 12. The class 12 refers to one of the output categories for the object(s) 12 of interest. For example, they can include but are not limited to: pothole 12, car 12, person 12, sign 12, etc. The network(s) 905 can detect, classify, and/or segment one or more classes 12 (also referred to as object(s) 12 of interest) in the image 106. It is recognized that other supplementary functions can take place in the encompassing software 117,118, for example object tracking or analysis of sensor data 107 in conjunction with the image processing 800 functions.

It is recognized that the identified object(s) 12 of interest are included in the processed image data 20 while discard data 19 is excluded from the processed image data 20, as one embodiment, such that the processed image data 20 and the sensor data 107 is transmitted to the server 111.

Further, it is recognized that the identified object(s) 12 of interest are included in the processed image data 20' while the discard data 19' is excluded from the processed image data 20', as one embodiment as implemented by the server 111.

Further, it is recognized that the identified object(s) 12 of interest and discard data 19 are included in unprocessed images 106 sent to the server 111 by the device 101 (including sensor data 107). Once received, then the server 111 would then process the images 106 as processed image data 20 while the discard data 19 is excluded from the processed image data 20, as one embodiment as implemented by the server 107.

Typically, image(s) 106 acquired by the device's 101 camera(s) 112 are available in some initial resolution, color space, and formatting. It is expected that in many cases, the image(s) 106 can need to undergo image processing 800 operations to optimize their compatibility with the neural networks 905 used and the object(s) 12 of interest which they are trained to identify. Some examples of image processing 1000 steps are resizing or adjusting resolution, field of view adjustments, cropping, and/or color space conversion. Other image processing 800 steps can include artificial intelligence steps 800 such as keypoint/landmark detection, polygon detection, and other neural networks that extract information 20 from images 106.

As such, the image processing 800 steps can include the resolution of the image 106 can be set based on the available resolutions present on the camera 112 device, whether available as resolutions or as a name representative of the resolution. Further, the field of view can be adjusted via adjusting the optical zoom levels of the camera(s) 112. Further, the field of view can be adjusted by a digital zoom process, wherein the picture 106 is magnified and only the parts of the image 106 that remain within the original dimensions are processed. Further, the region of interest 12 in the image 106 can be set. Once set, the region of interest 12 can be cropped. Further, the image processing can include color space conversion, whether from one space to another, or adjusting the formatting, order and/or channels of the utilized color space.

For example, the processing instructions 905 (e.g. neural network 905a,b) can be defined as a set of functions, operations and/or instructions which facilitates for the system 900 to train itself (not shown) based on annotated datasets, commonly referred to as "ground truth". Once trained, the system 900 can then infer on new datasets. The process is known as machine learning. The neural network(s) 905 utilized in the system 900 can be primarily geared towards inferring images 106 and deriving new information 20, 20' (for example, identifying object(s) 12 of interest in images 106 for automated incident identification and reporting). Once processed using the image processing instructions 905. Further, software 117,118 is configured to derive additional insights by associating the sensor information 107 (e.g. including geo coordinate data) for each of the images 106 and/or objects 12 of interest. It is recognised that during the processing of the images 106 using the image processing instructions 905, some of the image 106 data acquired can be discarded in view of the discarded image 106 data can not be required by the software 117,118, or can be redacted. It is recognized that discarded image 106 data can be referred to as discarded data 19,19' such that discarded data 19, is not transmitted 109 over the network 110 to the server 111, or can be discarded 19' on the server 111 before becoming available to a user.

The neural network(s) 905 utilized can have a plurality of architectures which pass the image 106 through a sequence of layers operations (not shown) which are aimed at aggregating, generalizing, manipulating and/or modifying the information of another layer for the purpose of inferring, detecting, classifying, marking and/or segmenting objects 12 in images 16. Examples of some typical operations in neural network(s) 905 are: (a) convolution; (b) rectification; (c) fully connected; (d) pooling layer (e) bottleneck and/or (f) loss layer.

The architecture of the system 900 can be a neural network 905 architecture such as: (a) single shot detector (SSD), (b) you only look once (YOLO), (c) convolutional neural network (CNN), (d) region-based convolutional neural network (R-CNN), (e) fast region-based convolutional neural network (Fast R-CNN), (d) faster region-based convolutional neural network (Faster R-CNN), (e), mask region-based convolutional neural network (Mask R-CNN), (f) region-based fully convolutional networks (R-FCN), or other published or proprietary neural network 905 architectures.

When a neural network 905 is trained on an image set, it can set certain parameters commonly known as weights. The parameters, or weights, are typically stored in a model file, or weights file. The neural network 905 utilized in the system 900 can be trained using published, well known, weights files as the basis. For example, MobileNet (such as MobileNetV1, MobileNetV3, MobileNetV3), Inception (such as InceptionV1, InceptionV2, InceptionV3), VGG, or other popular pre-trained networks, and can be composed of different number of layers (for example, ResNet50, ResNet101). However, the concept of such pre-trained neural networks 905 is the same whereas a base architecture with base weights is modified whereby one or more of the last or final layers is modified to detect or classify a set of objects 12 of interest, which can be identical, exclusive, partially inclusive, or fully inclusive of the original trained objects and can include new objects not present in the original neural network 905. Neural network(s) 905 can also be of a proprietary custom architecture with weights or parameters which are trained from scratch.

The neural network(s) 905 can be utilized as a detector 902. A detector 902 typically identifies an object 12 of interest in image(s) 106, and the location of the object 12. The location of the object 12 is typically in the form of a bounding box represented by coordinate(s) and/or distance(s) in relation to a point of reference 902 in the image 106. A detector 902 can also provide a score, typically known as confidence, which represents how sure the neural network 905 is in the object 12 detection. A detector 902 can also detect landmarks. Landmarks are points of reference in a known object 12. For example, in the context of a detector identifying a sign, the bottom of the sign pole and the top of the sign pole can be landmarks. Such landmarks can then be analyzed to derive further information about the status of a sign—for example, whether it is crooked or not.

The neural network(s) 905 can be utilized as a classifier 903. A classifier 903 has a list of potential classes, or object types, which it is trained to identify in a picture. When processing image(s) 106, a classifier 903 typically returns a list of potential object(s) 12 in the image 106, sorted by the model's confidence of their presence in the image 106. The neural network(s) 905 can be utilized as a segmentor 904. A segmentor 904 typically segments image(s) 106 into regions. The regions are then typically predicted to belong to a certain class 12, or type, which allows to extract a mask, or a pixel blob, that represents the class 12. A segmentor 904 can also separate instances of the object(s) 12 into separate object(s) 12 representing one or more classes 12. For example, a segmentor 904 can identify a pothole 12, and also the shape of the pothole 12, which can allow to estimate its surface area and severity.

The neural network(s) 905a, b can be designed and/or optimized to be used on the device's 101/server's 111 gpu, cpu or both. The workflows 906 can utilize one or more neural network(s) 905, and the neural network(s) 905 can be used in a sequence. One neural network(s) 905 can responsible for detecting 902 objects and/or regions of interest in the image(s) 106, and one or more additional neural network(s) 905 can be responsible for classifying 903 the objects 12 and/or regions of interest already detected in the image(s) 106. For example, a neural network 905 can detect 902 a pavement crack 12, crop it with image processing 800, and then another neural network 905 classifies 903 it as a longitudinal type of crack 12. It could also be used to verify that the first detection is correct. For example, the first neural network 905 can detect 902 a pothole 12, crop it using image processing 800, and pass it to a classifier 903 which confirms it is a pothole 12 and not a manhole. In some situations, this process provides the opportunity to classify 903 the object 12 of interest using a higher resolution, since the detector 902 can infer on a scaled down version of the image 106, whereas the cropped image 106 would be inferred at a higher resolution.

One neural network 905 can be responsible for detecting 902 objects 12 and/or regions 12 of interest in the image(s) 106, and one or more additional neural network(s) 905 is responsible for detecting 902 additional objects 12 and/or regions 12 of interest in the already detected area(s) of the image 106. For example, a neural network 905 detects a car 12 and then another neural network 905 detects a license plate 12 on the cars 12. One neural network 905 can be responsible for detecting 902 objects 12 and/or regions 12 of interest in the image(s) 106, and one or more additional neural network(s) 905 can be responsible for extracting landmarks 902 from the objects 12 and/or regions 12 of interest in the image 16. For example, a neural network 905 detects a pothole 12, and then another neural network 905 can identify its topmost point, bottom-most point, leftmost point, and rightmost point, and return those in a coordinate format respective to the image 106, or in a coordinate format respective to the object/region 12 of interest.

Further, the neural network inference can be processed on the device 101/server 111 GPU or CPU. The neural network 905 can infer multiple classes 12 simultaneously. Further, one or more of the neural networks 905 can be simplified by approximating the neural network to floating-point numbers for the purpose of reducing the memory and processing requirements. Such reduced neural networks, sometimes known as Quantized neural networks, are then used on the device 101 CPU 905.

Figure 7:
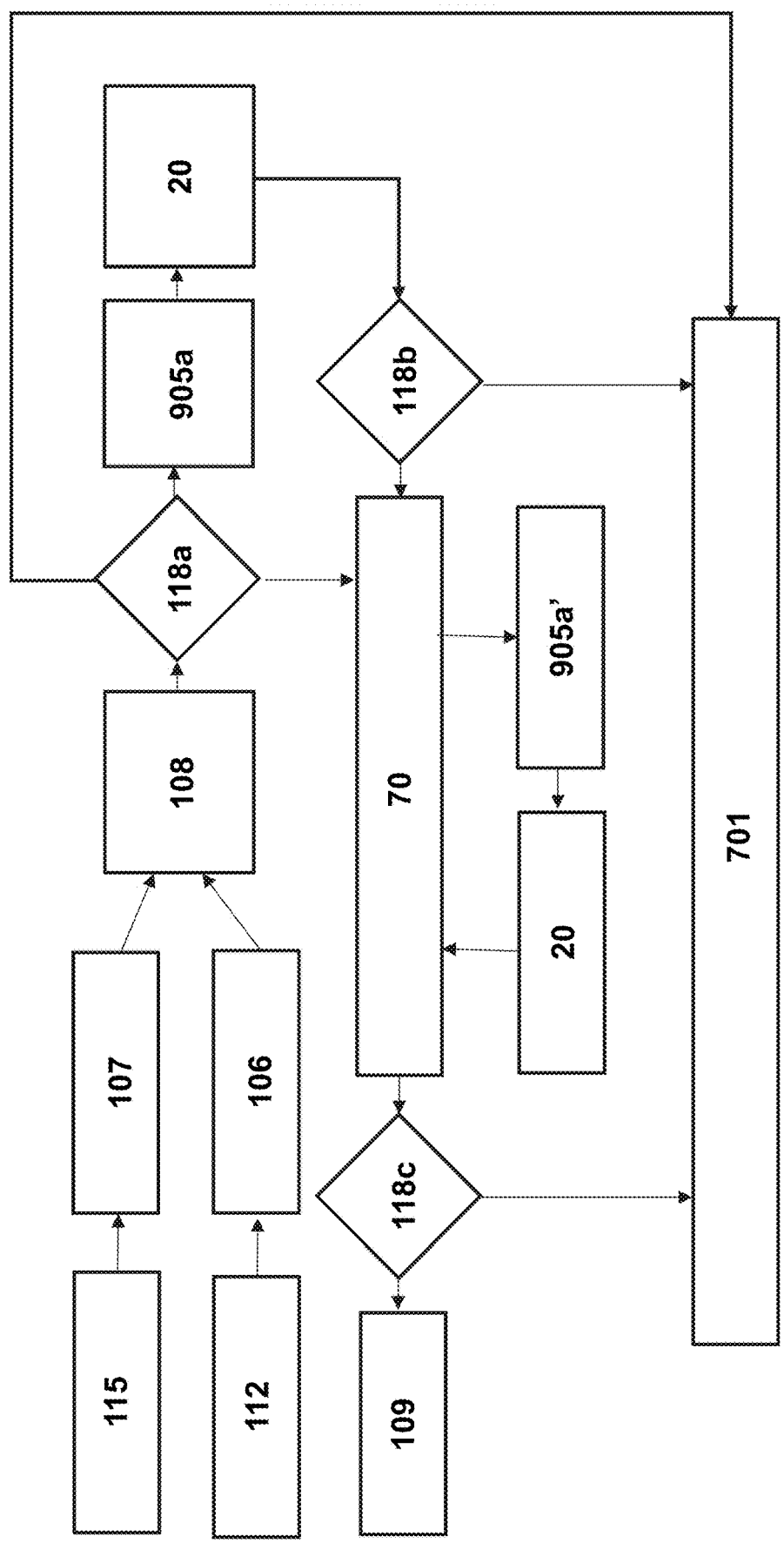
FIG. 7 depicts a sample data workflow on the device, and examples of how the device can decide whether to store, delete and/or transmit data to a server using the device's software and/or artificial intelligence for the system of FIG. 1A.

Referring to FIG. 7, we have an embodiment of a device 101 software 118 workflow 700 (e.g. as defined in the workflow 406c) that is related to the acquisition and processing of data 108. The device's 101 software 118 can typically poll the device's 101 sensors 115 in order to acquire sensor data 115. The device's software 118 can also typically open a camera 112 stream or individually grab image data 106 from the camera sensor 112 in order to collect images 106. The data 108, including sensor data 107 and image data 106 can be further processed by the device's 101 software 118, as desired.

The software 118 can have rules and programming which could determine whether to simply store the data 108 on the non-volatile memory 123 or discard it 701 based on information such as: (a) the available data 108; (b) GIS data 201'; (c) configuration parameters 301'; (d) other data; or (e) a combination thereof.

The software 118 can also employ image processing 905a operations (further described in FIGS. 8 and 9) after data 108 acquisition which can derive 118a additional information about the presence or absence of objects 20 in images 106, and additional descriptive properties 20 of such objects (see FIG. 8). The resultant data 108a of the artificial intelligence operations 905a can be further used to determine 118b whether to store 70 the data 108a or discard it 701. This process can be based exclusively on the object data 20, or used in conjunction with one or more of the following: (a) the available data 108; (b) the GIS data 201'; (c) the configuration parameters 301', or (d) other data.

The software 118 can also employ image processing 905a' operations after acquired data 108, resultant data 108a, or a combination thereof is stored on the device's 101 storage 123.

The artificial intelligence processes 905a,905a' can not be used at all, can be used before 905a storage 123, after storage 905a' or utilized both before 905a and after 905a' storage 123.

For example, data 108, including image data 106, can be acquired, then stored 123 and then processed 905a' by the artificial intelligence. In another embodiment, the data 108 can also be processed by the artificial intelligence 905a prior to being stored 123 (with or without additional object data 20), and subsequently processed by an additional artificial intelligence 905a'. In another embodiment, the data 108 can also be stored 123 without being processed by any artificial intelligence 905a, 905a'. In another embodiment, the data can also involve only initial image processing 905a prior to being stored, but not subsequently 905a'.

The device 101 can also have additional programming 118c, based on various criteria which can include (a) the object data 20 (b) the available data 108; (c) the GIS data 201'; (d) the configuration parameters 301', or (d) other data, whether to upload the information 108, 108a to the server 109, or discard it 701.

For greater clarity, discarding data 19,19', 701 can mean several things, depending on the workflow 406c, which can include one or more of the following functions: (a) deleting all or some of the data 108; (b) excluding the data 108 (for example by cropping the data 108 or substituting the data 108 with other data); (c) or marking the data 108 for removal in a database, even if not removed immediately; and (d) excluding the data 108 from presentation to the user which collected the data 108. The discarding 19,19', 701 can take place on the device 101, the server 109, or both.

Referring to FIG. 11, we depict a flow of data 1100 from the device 101 to a system 80 user. Data collected 108 on the device 101 and additional derivative data 1101 and/or metadata 1101 generated by the device 101 is transmitted 109 over the internet 110 to the server 111 using a wireless or cellular network 110.

Additional derivative data 1101 can include information which is not images 106 or sensor data 107 but data that is derived on the device 1101. It can include the device 101 calculating, deriving, inferring, noting or creating one or more values/parameters/fields/etc. which can relate to the data 201', 301', 108, for subsequent transmission 109. For example, the additional derivative data 1101 can include which segment ID on the road the device 101 travelled on, the direction of travel, presence or absence in a geo-zone, speed, the presence or absence of objects in images, data usage, correlation to data entries (i.e. nearest address or address range, nearest intersection, street name, locality), statistics, error reports, portions of data, redacted data and any other data that can be generated by the device's 101 software 118, which can be of use for the operation of the system 80 or can support obtaining additional insights from the data 108 collected.

The data 108,1101 can be sent to the server 111 using different methods (for example, using end points, file uploads/downloads, sessions, and other methods), using different protocols (for example, using MQQT, REST, or other protocols), and using different data structures (for example, files or database entries/scripts/files, such as images (for example, JPG, PNG, BMP, TIFF, and other), CSV, TXT, JSON, SQL, SQLLite and other data structures. The data can be sent all together (images 106 and associated data 107,1101), or it can be sent separately (images 106 sent separately from associated data 107,1101). Different types of data 108, 1101 can utilize different methods, protocols and data structures when communicated 109 to the server 111.

The data 108,1101 once received on the server 111, can undergo additional processing using the server's software 1102 (e.g. 117). Additional server 111 side processing can include artificial intelligence operations, software workflows, discarding/rejection of data, generation of new derivative data on the server, organizing the data for reports, organizing the data for storage, associating the data 108, 1101 with GIS data 201 on the server, creating relationships between the data 108,1101 and objects stores on the server, 111 amongst many other operations which are aimed to derive insights from the collected data 108,1101, and storing it in a secure manner until it is made available to a user. The resultant data 1105, whether modified or unmodified from the received data 108, 1101, would then be typically stored as files(s) in a file system 1103 and/or entry(s) in database(s) 1104 (e.g. 123*a*). In some embodiments, the resultant data 1105 can include image(s) 106, sensor data 107, objects identified by artificial intelligence 20,20', GIS data 201, parameters, 301, and other derivative/new data 1107.

Derivative/new data 1107 can also include additional information related to assets on the road the device 101 travelled on, road segment, the direction of travel, presence or absence in a geo-zone, speed, the presence or absence of objects in images, data usage, correlation to data entries (i.e. nearest address or address range, nearest intersection, street name, locality), statistics, error reports, portions of data, reports, redacted data and any other data that can be generated by the device's 101 software 118, which can be of use for the operation of the system or can support obtaining additional insights from the data collected.

A user can then access the resultant data 1105 through a client 1106 interface. The client 1106 interface can be a web application that can be accessed using a web browser or a client/server application that uses physical installation to a computer or a smartphone. The client 1106 can typically provide a user interface which allow the user to take certain actions, such as using menus, buttons, filters, and other software/web components to search, view, modify, produce report, print, delete, export and otherwise interact with the resultant data 1105.

We claim:

1. A system for generating digital images and related data as collected data along a roadway and for transmitting the collected data over a communications network to a server, the server located remotely from the system, the system comprising:
    a device having:
        at least one camera for obtaining the digital images;
        at least one sensor for acquiring the related data;
        a memory and at least one processor for executing collection instructions available to the device, the collection instructions defining operation of the at least one camera and the at least one sensor;
        a local storage; and
        a network interface for sending and receiving the collected data over the communications network to the server.

2. The system of claim 1, wherein the device communicates with the server by using a wireless or cellular network.

3. The system of claim 2, wherein the device utilizes local geospatial data which represents road assets.

4. The system of claim 3, wherein the device's software utilizes its location sensor and the local geospatial data to determine which road the vehicle is presently on, the geospatial assets included as part of the collection instructions.

5. The system of claim 4, wherein the collection instructions are periodically updated based on communication with the server over the communications network.

6. The system of claim 1, wherein the execution of the image collection instructions determines whether to or whether not to perform said generating the digital images and the related data on a road asset that the vehicle is currently travelling on based on one or more geospatial asset property fields associated with the road asset as defined in the collection instructions.

7. The system of claim 1, wherein the collected data is locally stored on the local storage.

8. The system of claim 1, wherein the collected data is transmitted to the server via the communications network.

9. The system of claim 1, wherein the collection instructions define whether to or whether not to perform said generating of the digital images and the related data based on a configuration setting.

10. The system of claim 1, wherein collection instructions define whether to or whether not to perform said generating the digital images and the related data based on a workflow included in the collection instructions, the workflow one of a plurality of workflows.

11. The system of claim 1, wherein the collection instructions define whether to or whether not to perform said generating the digital images and the related data based on new data derived from at least a portion of the collected data processed by the device.

12. The system of claim 1, wherein the collection instructions define whether to or whether not to perform said generating the digital images and the related data based on indication of a geolocation of the device within or outside of one or more geo-fenced zones defined in the collection instructions.

13. The system of claim 1, wherein the collection instructions define performing said generating the digital images and the related data-on behalf of one or more independent legal entities.

14. The system of claim 1, wherein the collection instructions define whether to or whether not to perform said generating the digital images and the related data based on when associated data of a geospatial asset was last collected by any other device.

15. The system of claim 1, wherein the collection instructions define whether to or whether not to inquire with the server whether to transmit or not at least a portion of the collected data prior to transmitting the collected data to the server.

16. The system of claim 1, wherein the collection instructions define whether to or whether not to perform said generating the digital images and the related data based on a presence or absence of objects identified in the digital images by at least one of image processing operations and artificial intelligence inference.

17. The system of claim 1, wherein the collected data includes derivative data generated based on the collection instructions.

18. The system of claim 1, wherein the collection instructions define to delete the collected data after one or more events occurring, consisting of: (a) the collected data is sent to the server by the device; (b) the server instructs the device not to send the collected data; and/or (c) the device determines data was already collected by another device.

19. The system of claim 1, wherein the collection instructions define to download updated geospatial asset data from the server, for use in updating the content of the collection instructions.

20. The system of claim 1, wherein the collected data on the server is accessible to a user via a client connected to the server.

* * * * *